(12) United States Patent
Mohseni

(10) Patent No.: US 9,488,810 B2
(45) Date of Patent: Nov. 8, 2016

(54) APPARATUSES AND METHODS TO IMAGE SURFACES WITH SMALL SPOT-SIZE AND LARGE FIELD OF VIEW

(71) Applicant: Northwestern University, Evanson, IL (US)

(72) Inventor: Hooman Mohseni, Wilmette, IL (US)

(73) Assignee: Northwestern University, Evanston, IL (US)

( * ) Notice: Subject to any disclaimer, the term of this patent is extended or adjusted under 35 U.S.C. 154(b) by 98 days.

(21) Appl. No.: 14/213,674

(22) Filed: Mar. 14, 2014

(65) Prior Publication Data

US 2014/0268371 A1    Sep. 18, 2014

Related U.S. Application Data

(60) Provisional application No. 61/792,830, filed on Mar. 15, 2013.

(51) Int. Cl.
*G02B 9/04* (2006.01)
*G02B 13/00* (2006.01)
*G02B 27/46* (2006.01)

(52) U.S. Cl.
CPC ............ *G02B 13/005* (2013.01); *G02B 27/46* (2013.01)

(58) Field of Classification Search
CPC .......... G03H 1/041; G03H 2001/045; G03H 2001/0216; G03H 2223/16; G03H 2223/55; G02B 27/0025; G02B 27/0012; G02B 27/0961; G02B 21/361; G02B 27/0101; G02B 27/50; G02B 13/005; G02B 27/46; G01N 21/8901

See application file for complete search history.

(56) References Cited

U.S. PATENT DOCUMENTS 5,276,498 A * 1/1994 Galbraith ......... G01N 21/95623
250/550

OTHER PUBLICATIONS

Heifetz et al., Photonic Nanojets, J. Comput. Theor. Nanosci., vol. 6, 2009, pp. 1979-1992.

* cited by examiner

*Primary Examiner* — Alicia M Harrington
(74) *Attorney, Agent, or Firm* — Bell & Manning, LLC

(57) ABSTRACT

Apparatuses and methods to image onto a flat surface with a spot-size that is about less than or equal to the wavelength of an incident planar electromagnetic wave, and with large field of view, are disclosed herein. More specifically, the apparatuses and methods disclosed herein utilize two hemispheres comprised of one or more dielectric materials to produce the Fourier transform of an incident planar electromagnetic wave onto a flat surface located in a projection plane.

16 Claims, 34 Drawing Sheets

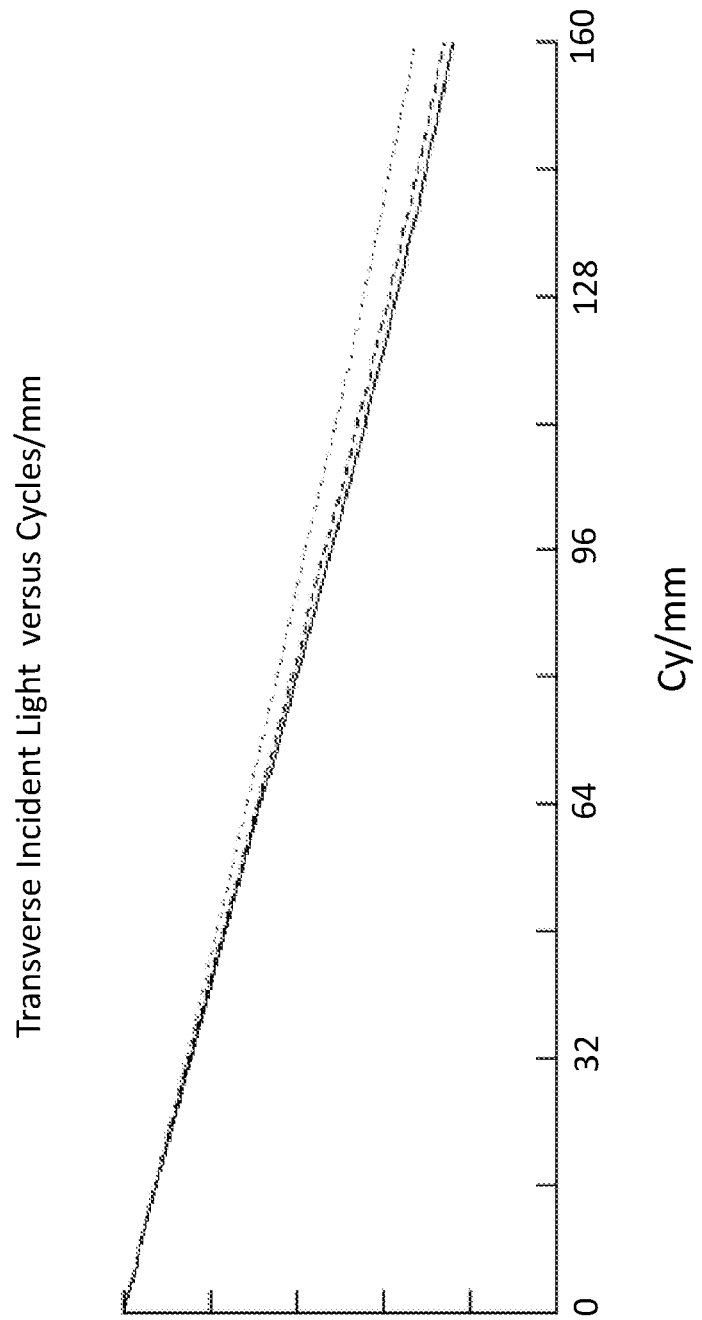

APPARATUSES AND METHODS TO IMAGE SURFACES WITH SMALL SPOT-SIZE AND LARGE FIELD OF VIEW

CROSS-REFERENCE TO RELATED APPLICATIONS

This application claims benefit of priority to U.S. provisional application No. 61/792,830, filed on Mar. 15, 2013, which is incorporated by reference in its entirety.

FIELD OF THE INVENTION

This invention pertains to apparatuses and methods for imaging surfaces. In particular, apparatuses and methods to image onto a flat surface with a spot-size and with a large field of view are disclosed herein.

BACKGROUND

Numerous applications, such as detector and display arrays, require imaging an object onto a flat surface with spot-size (i.e., point spread function or "PSF") that is about less than or equal to the wavelength of the incident electromagnetic wave, and with large field of view. Customarily, traditional optics comprising the capability to image in such applications are bulky, heavy, generally include several complex lenses and refractive and/or reflective elements, are expensive to manufacture, and troublesome to operate.

An apparatus that produces spot-size that is about less than or equal to the wavelength of the incident electromagnetic wave is the photonic jet. A prior art photonic jet is depicted in FIG. 1. A photonic jet is a dielectric sphere having proper optical refractive index to focus an incident plane electromagnetic wave into a rod of light (i.e., the Fourier transform of the incident plane electromagnetic wave), the beam having a length about as great as the diameter of the Fourier transformed incident plane electromagnetic wave.

The use of the photonic jet to image onto a flat surface is not without limitation. Referring to FIG. 1, the photonic jet focuses light into a spherical surface. As illustrated in FIG. 1, the exit point of the Fourier transformation of an incident plane electromagnetic wave (i.e., the rod of light) is dependent upon the angle of incidence of the plane electromagnetic wave with respect to the projection plane. Thus the Fourier transformation of an incident plane electromagnetic wave produced by a photonic jet does not necessarily have a wide field of view. This lack of wide field of view represents a major limitation in many applications, such as when imaging conventional detector and display arrays, since conventional detector and display arrays are built on flat surfaces.

SUMMARY

In a first embodiment, an apparatus for producing the Fourier transform of an incident electromagnetic wave on a flat surface placed in a projection plane, the Fourier transform having a spot-size about less than or equal to one-half of the wavelength of said incident planar wave, is disclosed. This apparatus includes a first hemisphere and second hemisphere. The first hemisphere has a first planar side and a first spherical side and is oriented so that the first planar side is nearer to the incident electromagnetic wave than the first spherical side. The second hemisphere has a second planar side and a second spherical side and is oriented so that the second spherical side is nearer the first hemisphere than said second planar side. The first hemisphere and second hemisphere project the Fourier transform of the incident planar electromagnetic wave to the projection plane.

The diameter of the first planar side of the first hemisphere of the apparatus can be greater than or equal to one-half of the wavelength of the incident electromagnetic wave. In addition, the first hemisphere can be comprised of a first dielectric material. The first dielectric material is transparent to the wavelength of the incident electromagnetic wave, and comprises an index that is between 0.4 and 0.7 greater than the surrounding medium. The first dielectric material can be glass, borosilicate glass, PMMA, PET, PE, HDPE, LDPE, PP, HDPP, LDPP, PE, HDPE, LDPE, or $Al_2O_3$.

The diameter of the second planar side of the second hemisphere of the apparatus can be greater than or equal to one-half of the wavelength of the incident electromagnetic wave. In addition, the second hemisphere can be comprised of a second dielectric material. The second dielectric material is transparent to the wavelength of the incident electromagnetic wave, and comprises an index that is between 0.4 and 0.7 greater than the surrounding medium. Without intending to be limiting, the second dielectric material can be glass, borosilicate glass, PMMA, PET, PE, HDPE, LDPE, PP, HDPP, LDPP, PE, HDPE, LDPE, or $Al_2O_3$.

The distance between the between the first spherical side of the first hemisphere and the second spherical side of the second hemisphere of this embodiment is less than or equal to the radius of the smaller of either the first hemisphere or the second hemisphere.

Lastly, the surface of the apparatus placed in the projection plane of this embodiment can include a photosensitive device such as a film or detector array.

In a second embodiment, a method for imaging onto a flat surface with a resolution that is about less than or equal to one-half of the wavelength of an incident planar electromagnetic wave is disclosed. The method involves providing a first hemisphere, a second hemisphere, and a flat light sensitive surface. The first hemisphere has a first planar side and a first spherical side, and is oriented so the first planar side is nearer to the incident electromagnetic wave than the first spherical side. The second hemisphere has a second planar side and a second spherical side, and is oriented so that the second spherical side is nearer the first hemisphere than said second planar side. The flat light sensitive surface is placed subsequent to said second hemisphere and is in contact with the planar side of said second hemisphere. The first hemisphere is exposed to said incident electromagnetic wave, and the Fourier transform of said incident electromagnetic wave is produced onto the flat light sensitive layer.

The planar incident electromagnetic wave of the second embodiment can have a wavelength greater than or equal to one nanometer.

The diameter of the first planar side of the first hemisphere of this method can be greater than or equal to one-half of the wavelength of the incident electromagnetic wave. In addition, the first hemisphere can be comprised of a first dielectric material. The first dielectric material is transparent to the wavelength of the incident electromagnetic wave, and comprises an index that between 0.4 and 0.7 greater than the surrounding medium. The first dielectric material can be glass, borosilicate glass, PMMA, PET, PE, HDPE, LDPE, PP, HDPP, LDPP, PE, HDPE, LDPE, or $Al_2O_3$.

The diameter of the second planar side of the second hemisphere of this method can be greater than or equal to one-half of the wavelength of the incident electromagnetic wave. In addition, the second hemisphere can be comprised of a second dielectric material. The second dielectric material is transparent to the wavelength of the incident electromagnetic wave, and comprises an index that between 0.4 and 0.7 greater than the surrounding medium. The second dielectric material can be glass, borosilicate glass, PMMA, PET, PE, HDPE, LDPE, PP, HDPP, LDPP, PE, HDPE, LDPE, or $Al_2O_3$.

The distance between the first spherical side of the first hemisphere and the second spherical side of the second hemisphere of this method is less than or equal to the radius of the smaller of either the first hemisphere or the second hemisphere.

Lastly, the surface placed in the projection plane of this method can include a photosensitive device such as a film or detector array.

BRIEF DESCRIPTIONS OF THE DRAWINGS

Figure 7A:
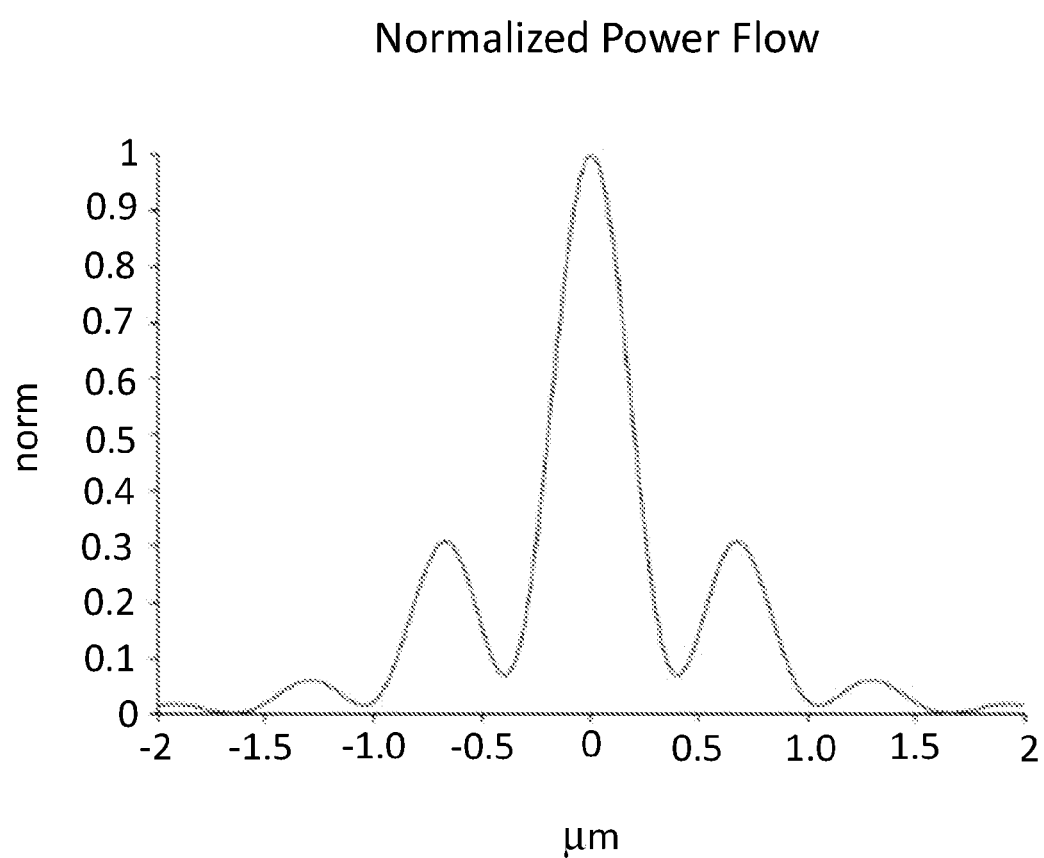
FIG. 7A depicts power flow in surfaces perpendicular to the axis on the flat surface of the second hemisphere per 1/mm for 2 micron<x<2 micron and y–0.
Figure 7B:
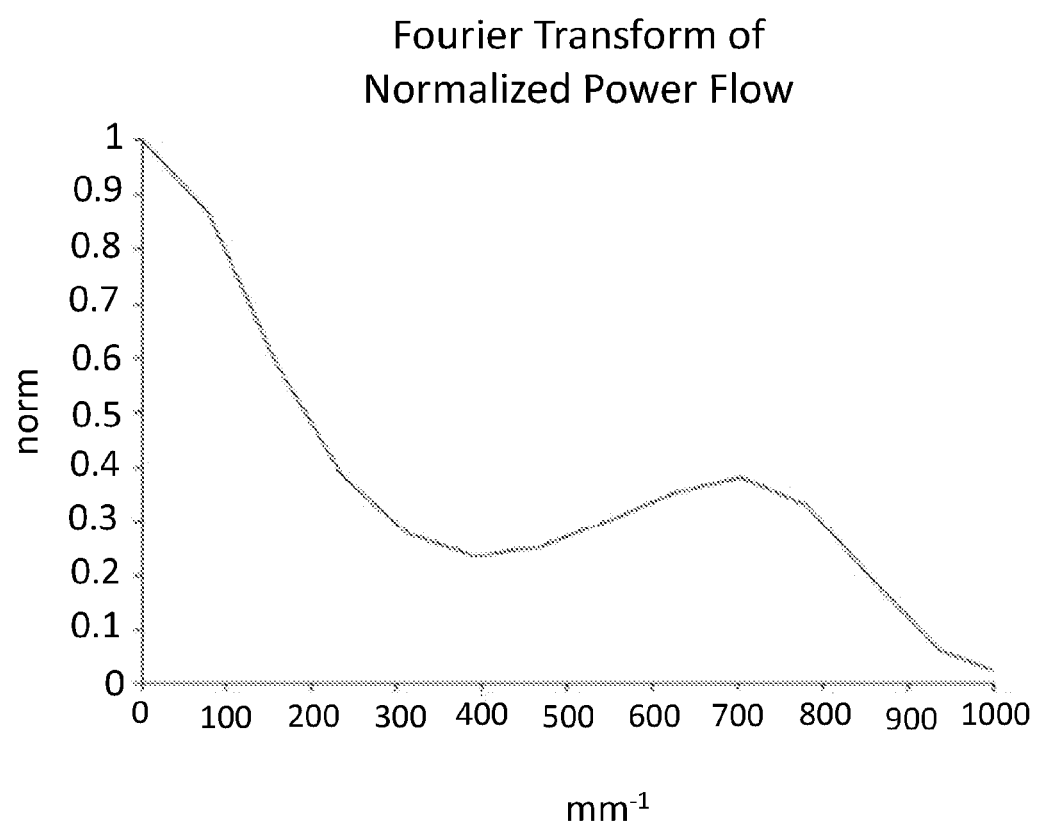
FIG. 7B depicts a normalized Fourier Transform of the power flow of FIG. 7A.
Figure 7C:
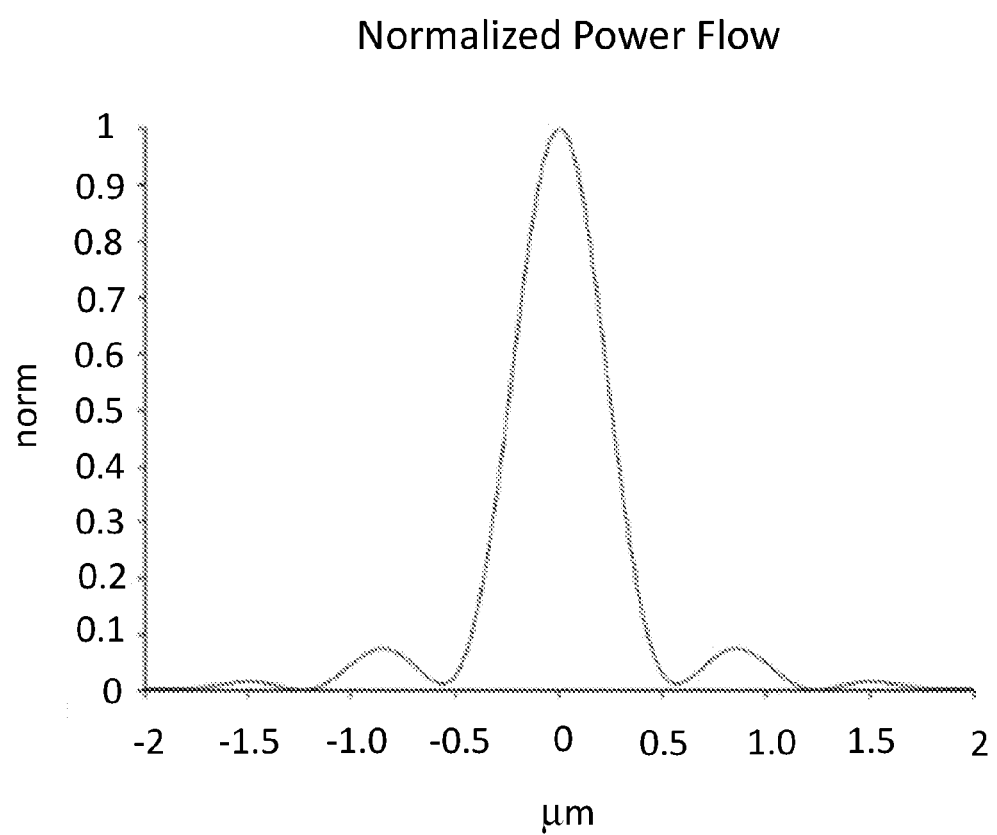

FIG. 7C depicts power flow in surfaces perpendicular to the axis 1 micron away from the flat surface of the second hemisphere per 1/mm for 2 micron<x<2 micron and y–0.

Figure 7D:
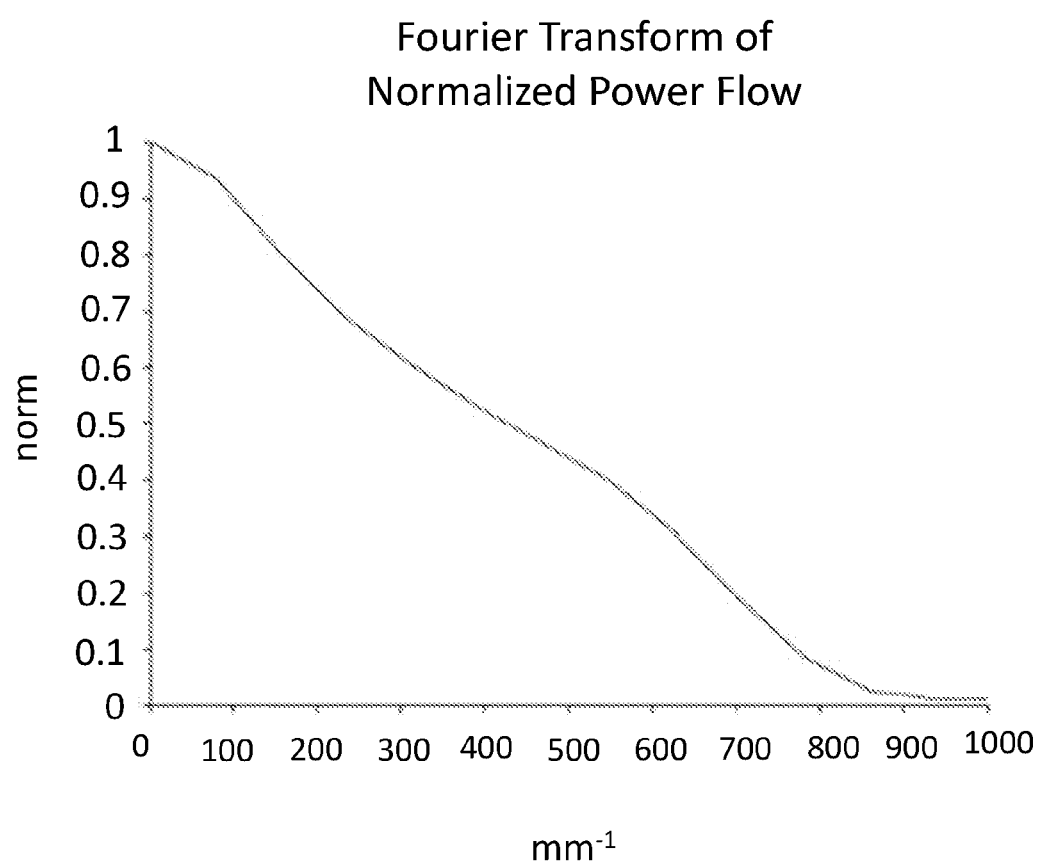

FIG. 7D depicts a normalized Fourier Transform of the power flow of FIG. 7C.

Figure 7E:
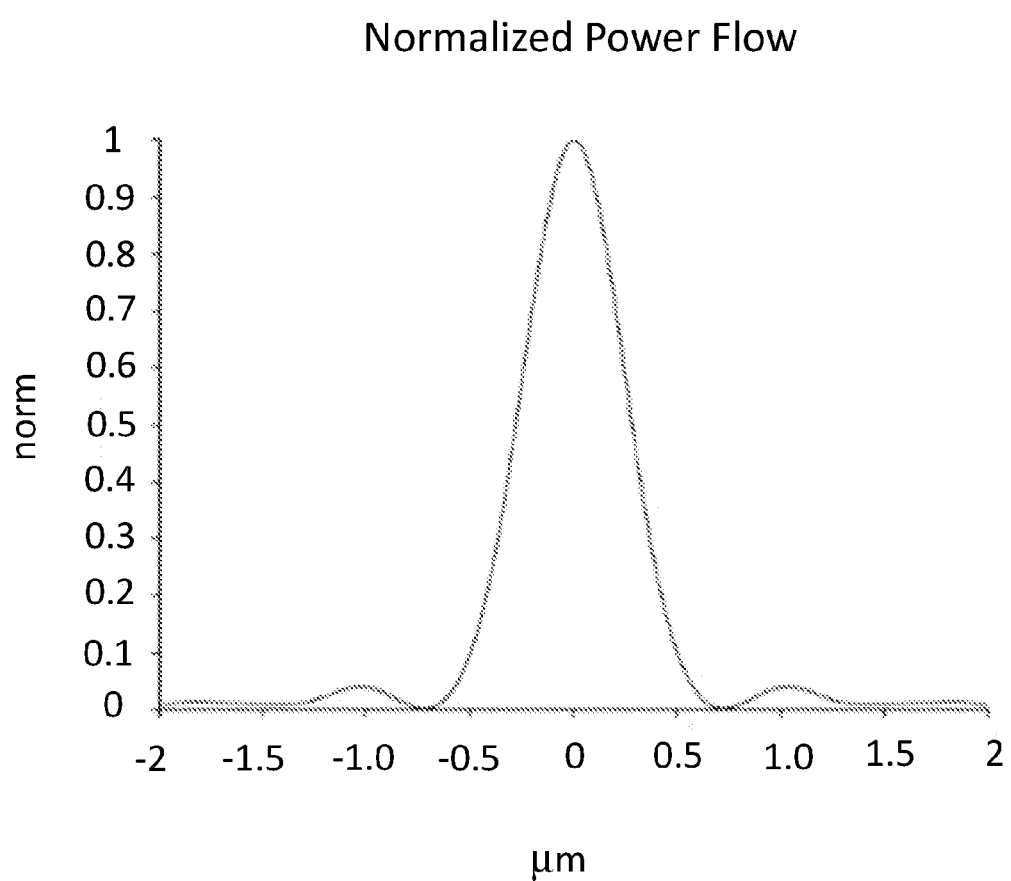

FIG. 7E depicts power flow in surfaces perpendicular to the axis 2 microns away from the flat surface of the second hemisphere per 1/mm for 2 micron<x<2 micron and y–0.

Figure 7F:
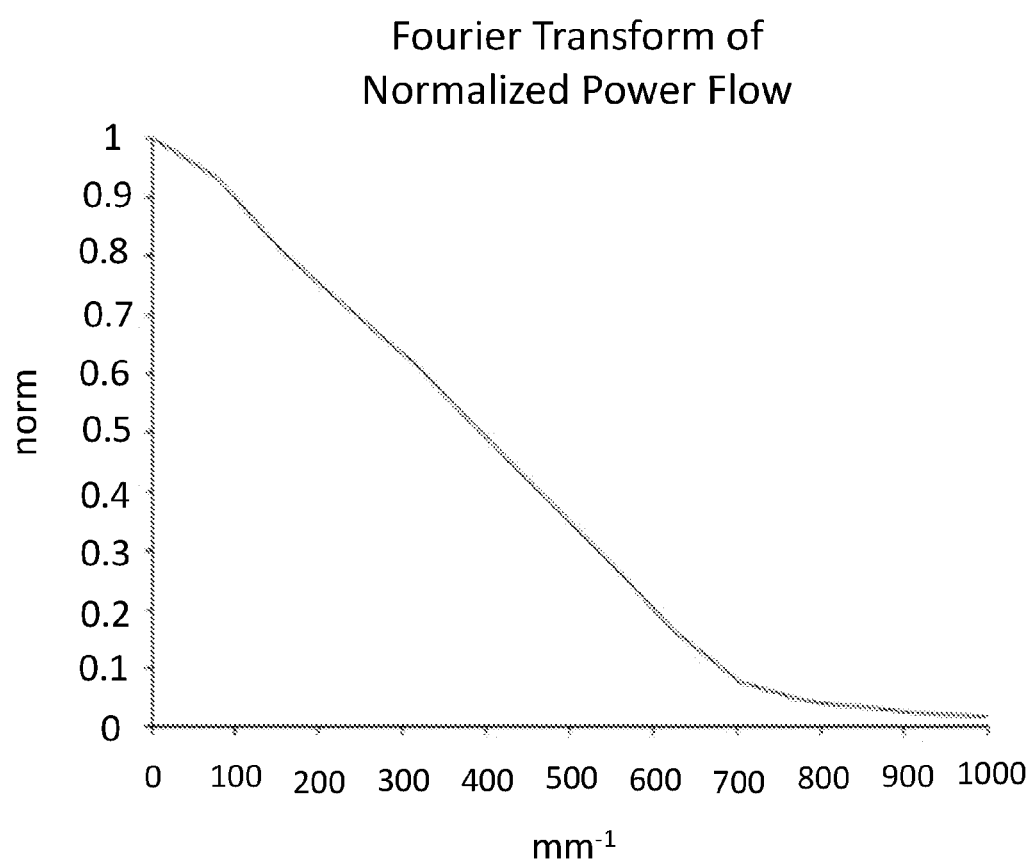

FIG. 7F depicts a normalized Fourier Transform of the power flow of FIG. 7E.

Figure 8A:
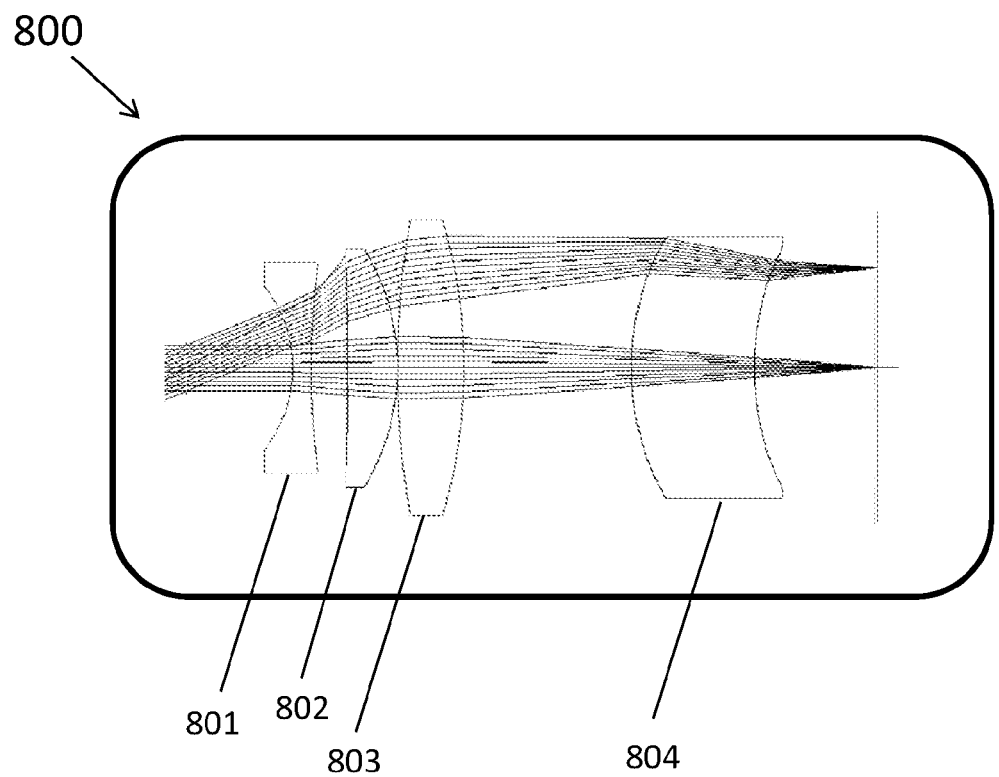

FIG. 8A depicts a 2D view of ray trajectory for a prior art, 4 element telecentric lenses with incident light angels equal to 0 degree and 25 degree.

Figure 8B:
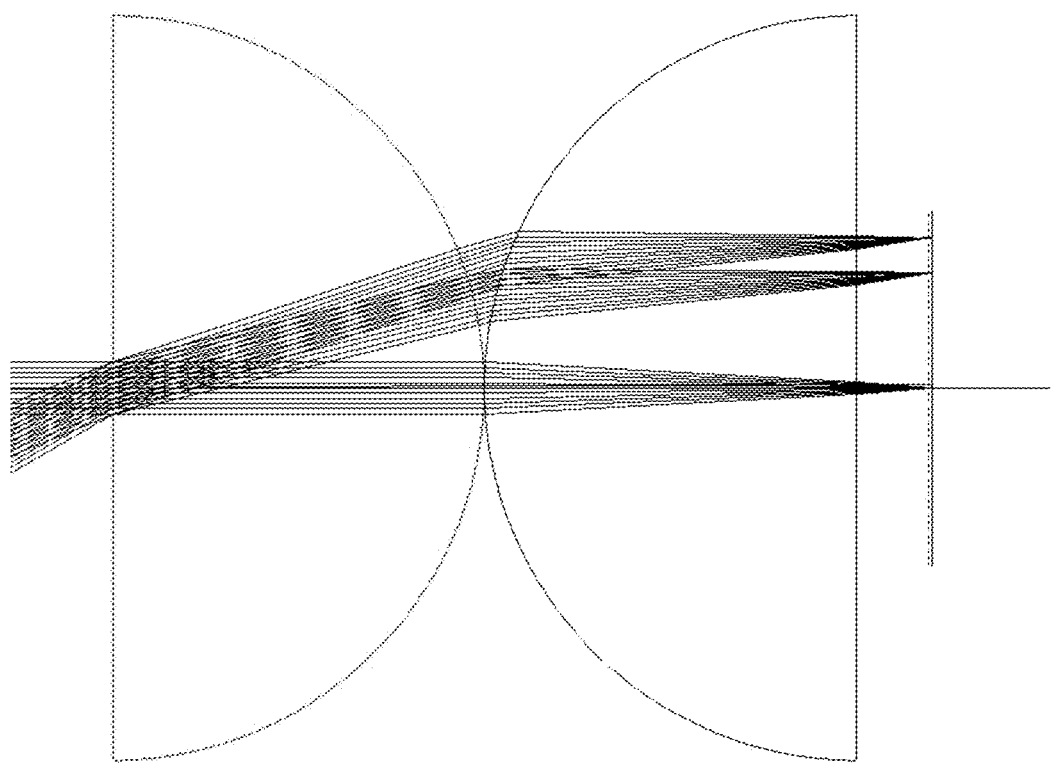

FIG. 8B depicts a 2D view of ray trajectory for an exemplary embodiment of the JJPL disclosed herein with incident light angels equal to 0 degree and 25 degree and 35 degree.

Figure 9A:
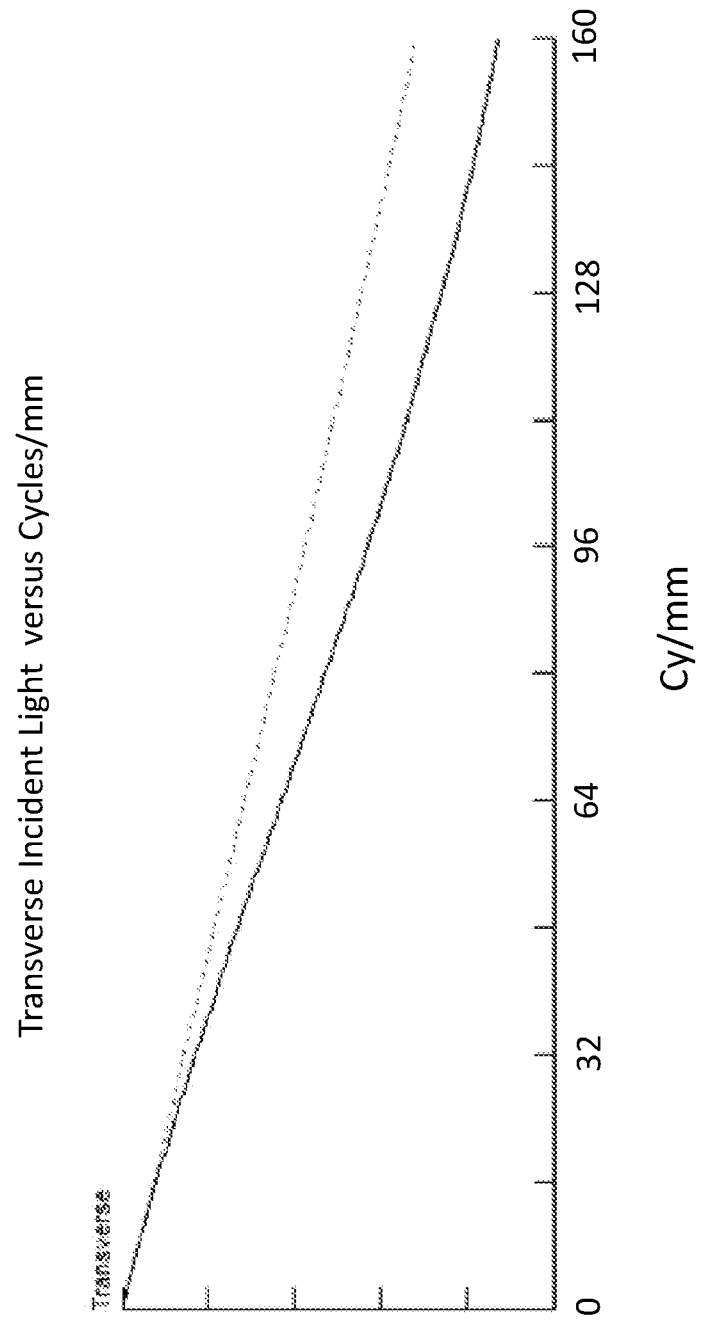

FIG. 9A depicts transverse incident light as a function of cycles/mm (Cy/mm) for the JJPL having effective focal length of 1 mm for incident light angel set equal to 0 degrees.

Figure 9B:
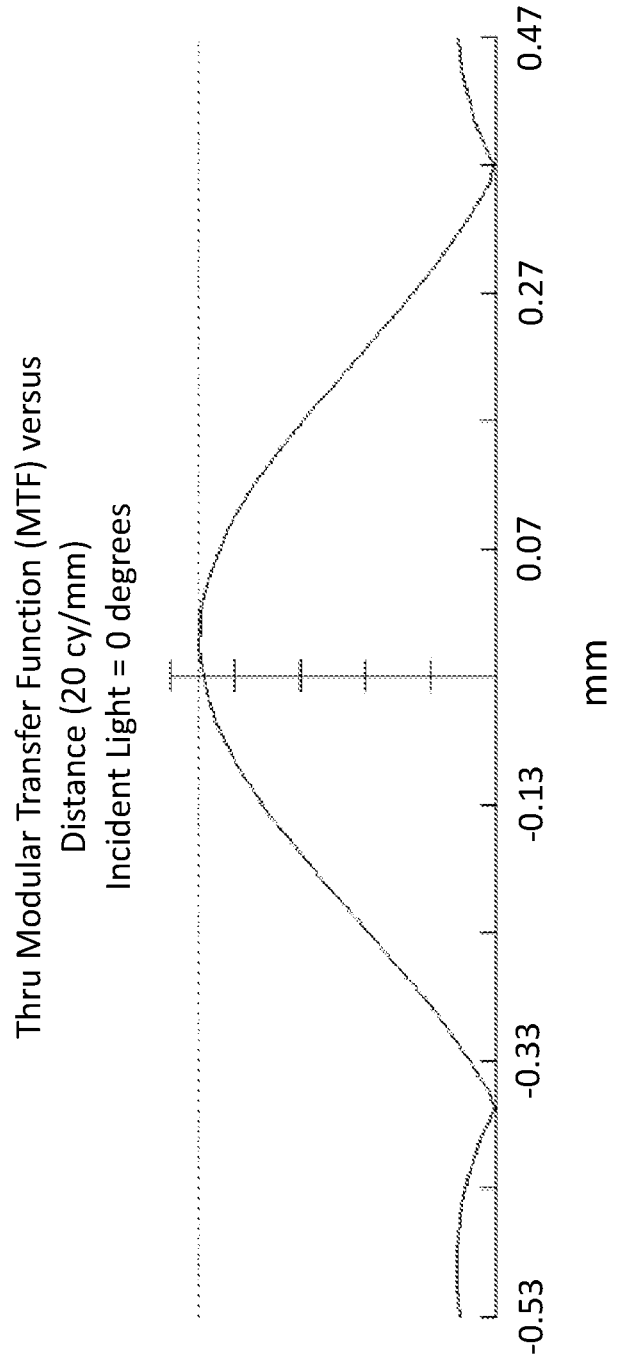

FIG. 9B depicts a plot of the Thru MTF as a function of distance (mm) for data presented in FIG. 9A.

FIG. 9C depicts transverse incident light as a function of cycles/mm (Cy/mm) for the JJPL having effective focal length of 1 mm for incident light angel set equal to 26 degrees.

Figure 9D:
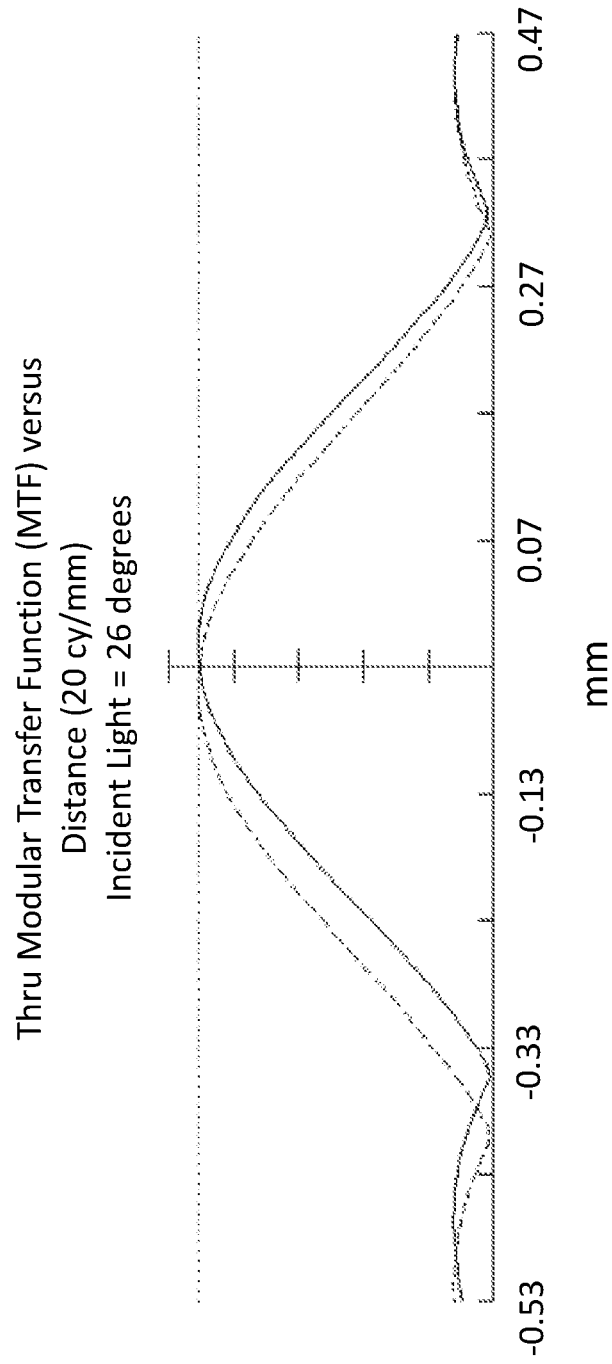

FIG. 9D depicts a plot of the Thru MTF as a function of distance (mm) for data presented in FIG. 9C.

Figure 9E:
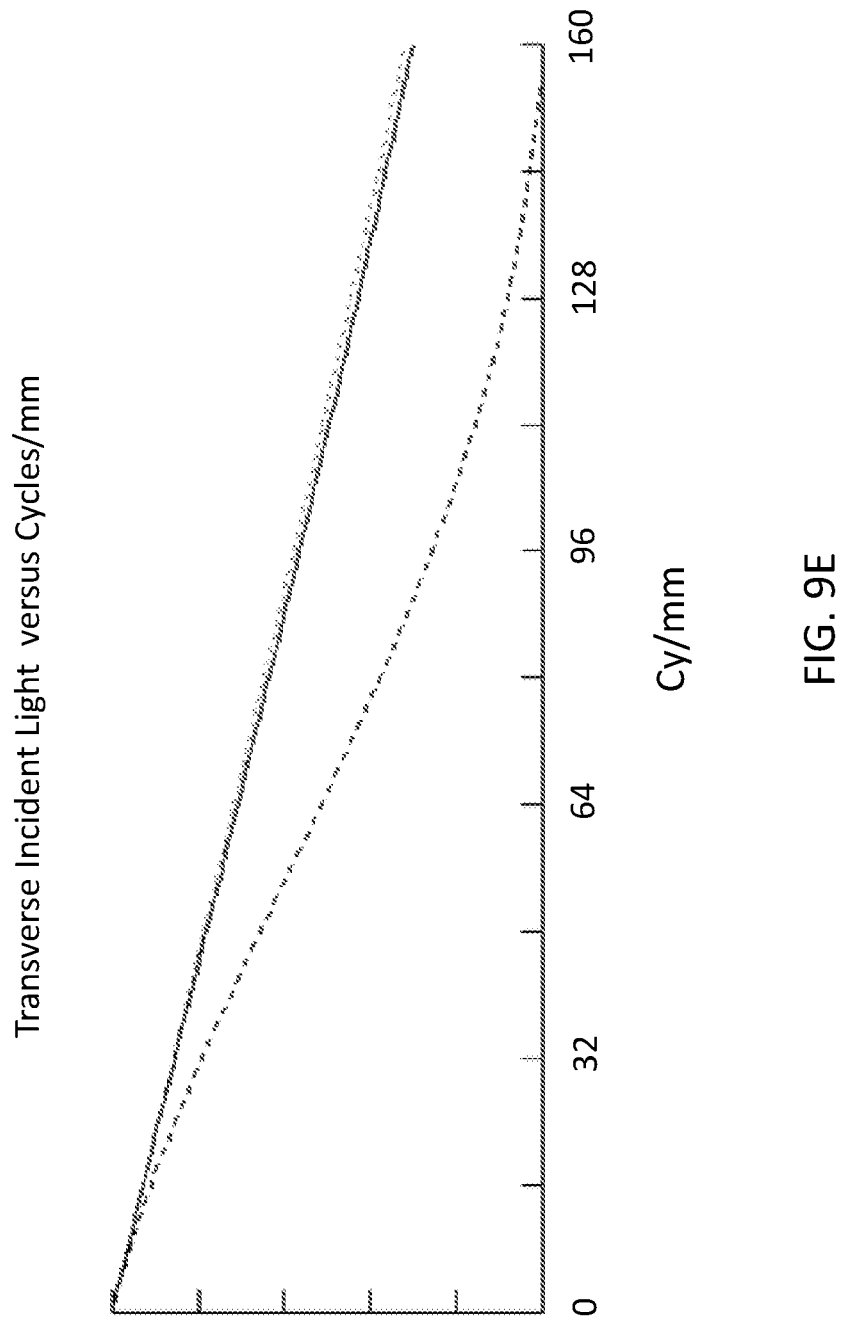

FIG. 9E depicts transverse incident light as a function of cycles/mm (Cy/mm) for the JJPL having effective focal length of 1 mm for incident light angel set equal to 35 degrees.

Figure 9F:
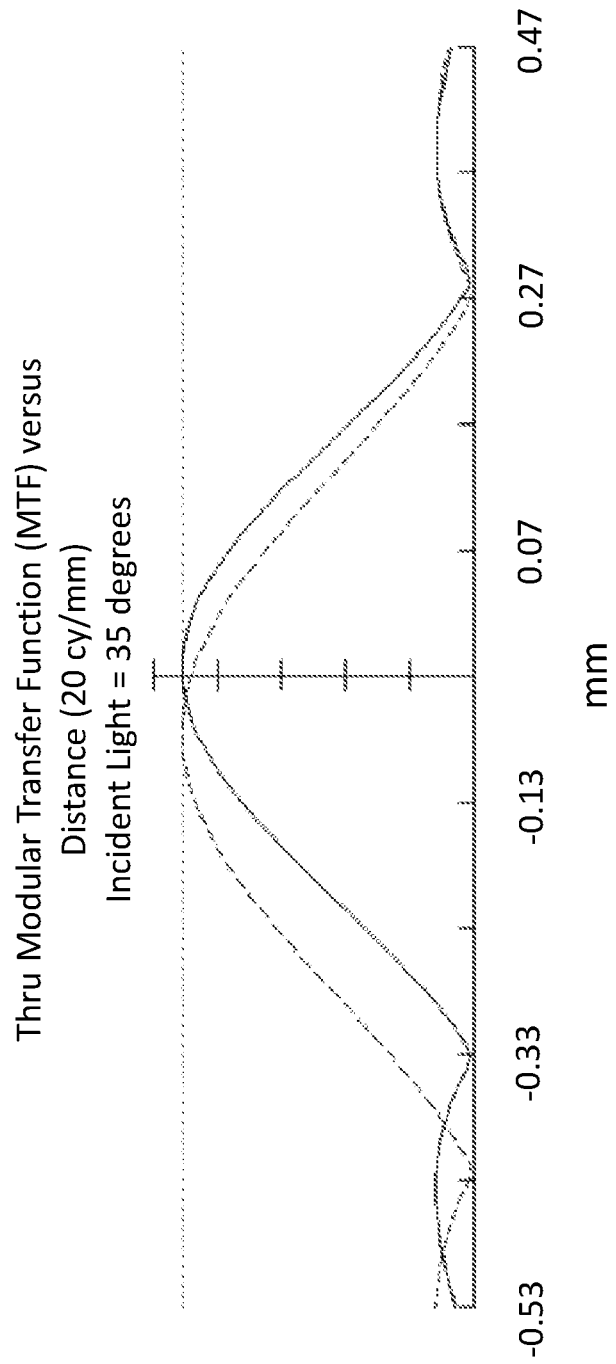

FIG. 9F depicts a plot of the Thru MTF as a function of distance (mm) for data presented in FIG. 9E.

Figure 10A:
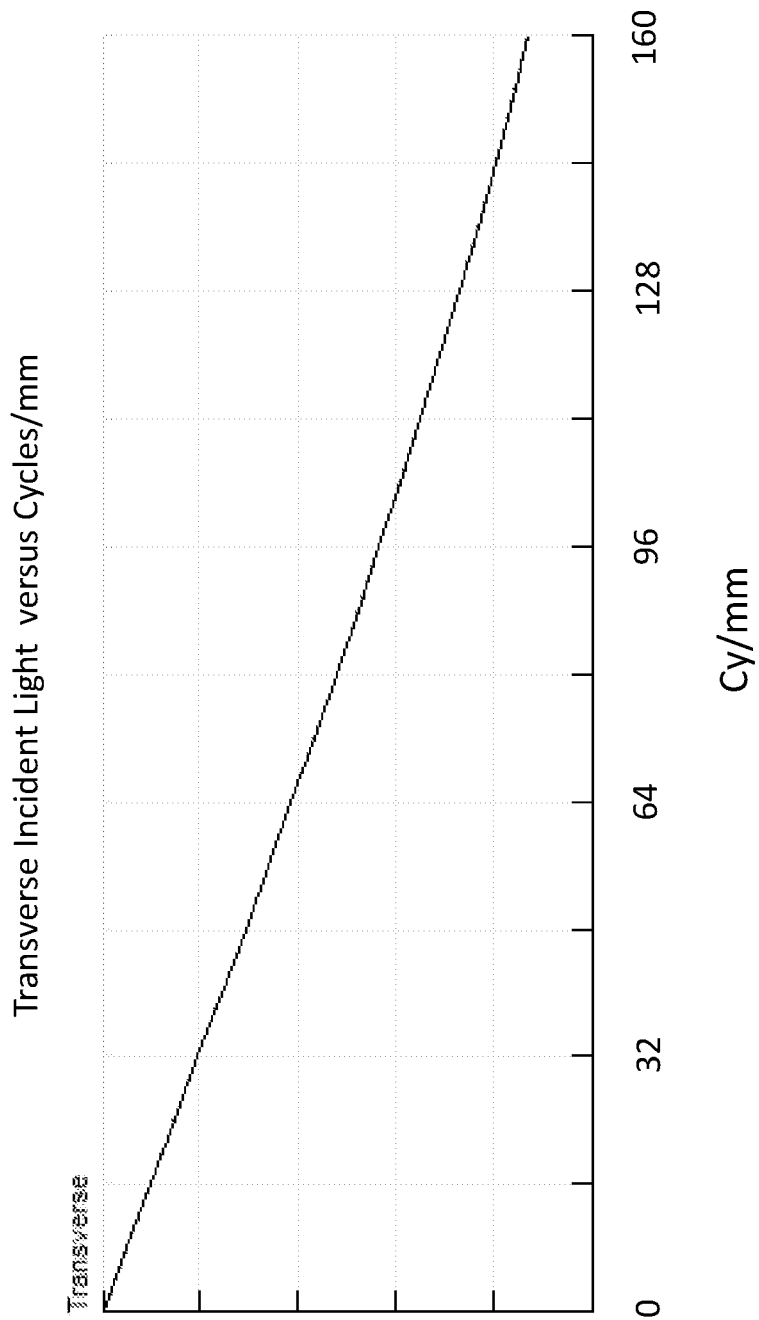

FIG. 10A depicts transverse incident light as a function of cycles/mm (Cy/mm) for the telecentric lens having effective focal length of 1 mm for incident light angel set equal to 0 degrees.

Figure 10B:
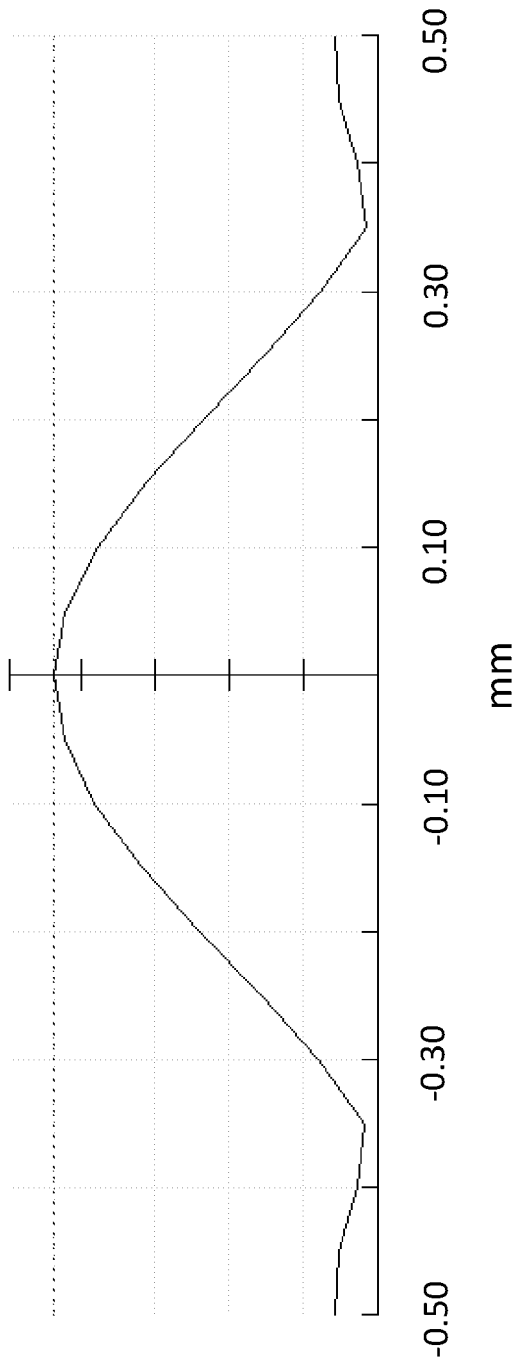

FIG. 10B depicts a plot of the Thru MTF as a function of distance (mm) for data presented in FIG. 10A.

Figure 10C:
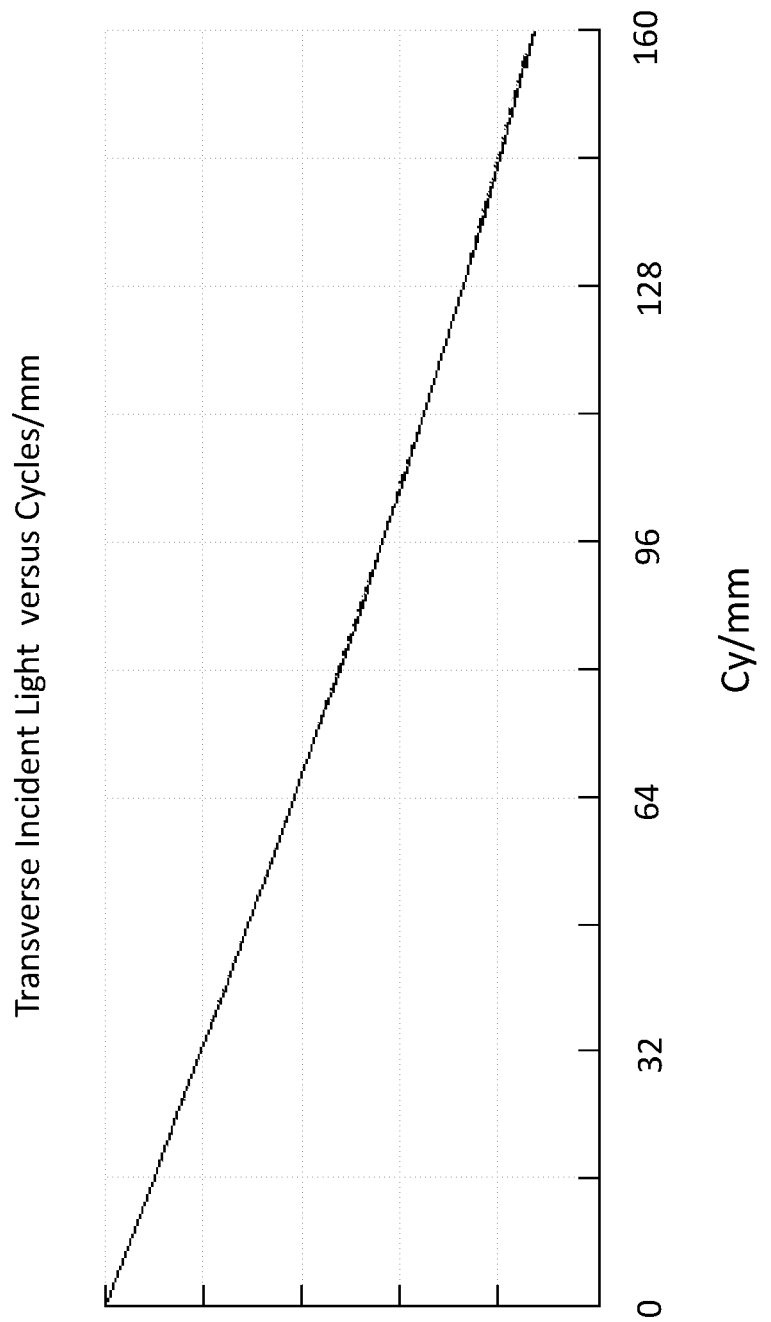

FIG. 10C depicts transverse incident light as a function of cycles/mm (Cy/mm) for the telecentric lens having effective focal length of 1 mm for incident light angel set equal to 26 degrees.

Figure 10D:
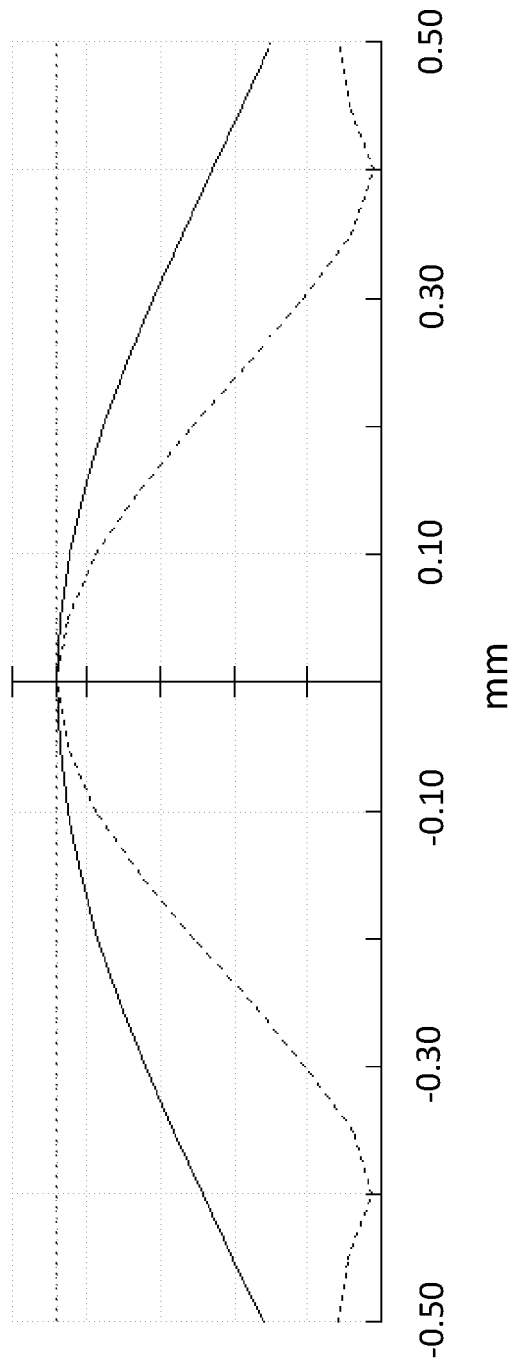

FIG. 10D depicts a plot of the Thru MTF as a function of distance (mm) for data presented in FIG. 10C.

Figure 10E:
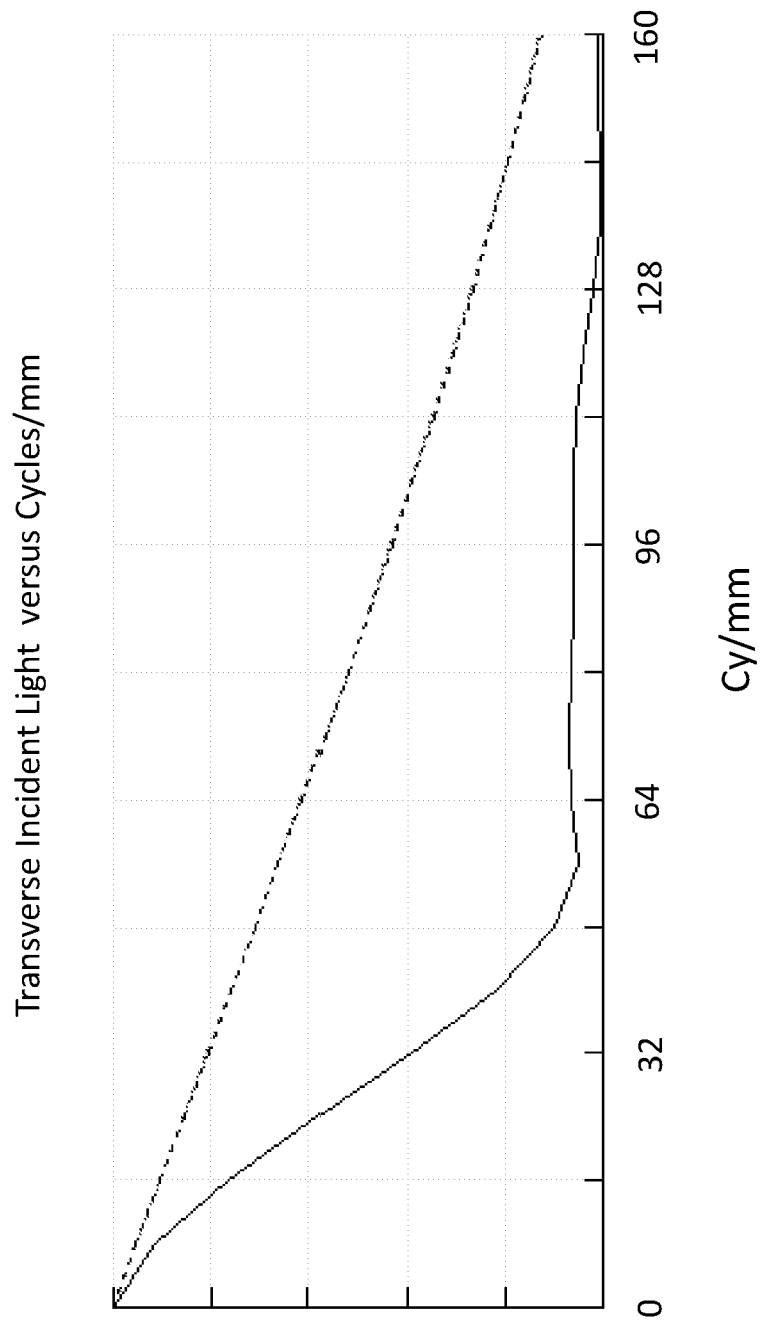

FIG. 10E depicts transverse incident light as a function of cycles/mm (Cy/mm) for the telecentric lens having effective focal length of 1 mm for incident light angel set equal to 35 degrees.

Figure 10F:
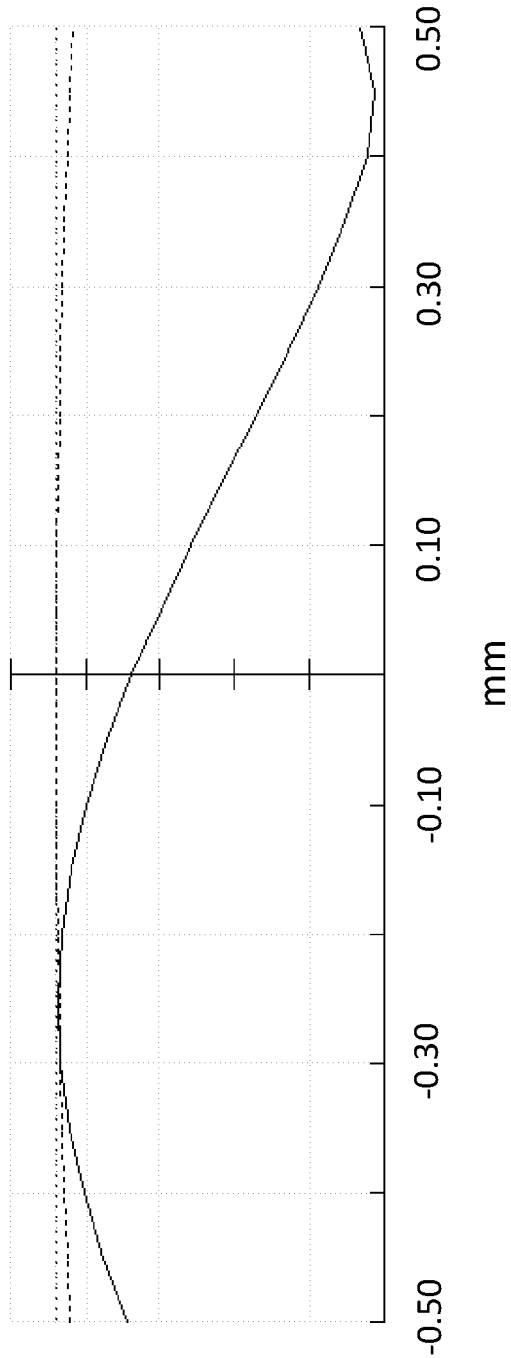

FIG. 10F depicts a plot of the Thru MTF as a function of distance (mm) for data presented in FIG. 10E.

DETAILED DESCRIPTION

The apparatus disclosed herein is a novel means to produce the Fourier transform ("the photonic nanojet") of an incident planar electromagnetic wave on a flat surface placed in a projection plane, the Fourier transform having a spot-size less than or equal to one-half of the wavelength of the incident planar electromagnetic wave. Referring to FIG.

2, in a preferred embodiment, the apparatus comprises a first hemisphere 201. The first hemisphere has a first planar side 202 and a first spherical side 203. The apparatus further includes a second hemisphere 204. The second hemisphere has a second planar side 205 and a second spherical side 206. The first hemisphere is placed subsequent to an incident planar electromagnetic wave 207, and is oriented so that the first planar side is nearer to the incident planar electromagnetic wave than the first spherical side. The first hemisphere and the second hemisphere project the Fourier transform of the incident planar wave to the projection plane 208.

In a more preferred embodiment, the incident planar electromagnetic wave 207 has a wavelength greater than or equal to one nanometer. Moreover, in this more preferred embodiment the first planar side 202 has a diameter that is greater than or equal to one-half the wavelength of the incident planar electromagnetic wave 207. Moreover, in this more preferred embodiment, the second planar side 205 has a diameter that is greater than or equal to one-half the wavelength of the incident planar electromagnetic wave 207.

In this more preferred embodiment the first hemisphere 201 is comprised of a dielectric material that is transparent to the wavelength of the incoming planar incident electromagnetic wave 207 and comprises an index that is between 0.4 and 0.7 greater than the surrounding medium. While not meant to be limiting, some dielectric materials from which the first hemisphere is comprised include glass, borosilicate glass, Poly(methyl methacrylate) ("PMMA"), Polyethylene Terephthalate ("PET"), Polyethylene ("PE"), High Density Polyethylene ("HDPE") Low Density Polyethylene ("LDPE") polypropylene ("PP"), High Density Polypropylene ("HDPP"), Low Density Polypropylene ("LDPP"), and Aluminum Oxide ("$Al_2O_3$").

In this more preferred embodiment, the second hemisphere 204 is comprised of a dielectric material that is transparent to the wavelength of the incoming planar incident electromagnetic wave 207 and comprises an index that is between 0.4 and 0.7 greater than the surrounding medium. While not meant to be limiting, some dielectric materials from which the second hemisphere is comprised include glass, borosilicate glass, Poly(methyl methacrylate) ("PMMA"), Polyethylene Terephthalate ("PET"), Polyethylene ("PE"), High Density Polyethylene ("HDPE") Low Density Polyethylene ("LDPE") polypropylene ("PP"), High Density Polypropylene ("HDPP"), Low Density Polypropylene ("LDPP"), and Aluminum Oxide ("$Al_2O_3$"). The first hemisphere and the second hemisphere can comprise the same dielectric material, or different dielectric material. The dielectric material comprising the first hemisphere and second hemisphere need not be the same. Moreover, the dielectric material of the first hemisphere and the second hemisphere need not be different.

In a still further preferred embodiment, the apparatus disclosed herein comprises a flat light sensitive surface placed in the projection plane 208. While not meant to be limiting, the flat light sensitive surface comprises a photosensitive film or detector array. Moreover, the distance ($\Delta Z$) 209 between the first spherical side and said second spherical side is less than or equal to the radius of the smaller of either the first hemisphere or second hemisphere.

Due to the reciprocity of the optics disclosed herein, the above two hemispheres can also produce the Fourier transform of an image placed in the projection plane at the far-field. Thus, a conventional flat imaging array, or display, can be hybridized with this type of apparatus to produce a three-dimensional images or display. In this particular instance, the electromagnetic wave source would be placed at the projection plane, or the scatter from objects placed at the projection plane, would be produced by the optics in the far-field rather than in the near-field.

Figure 1:
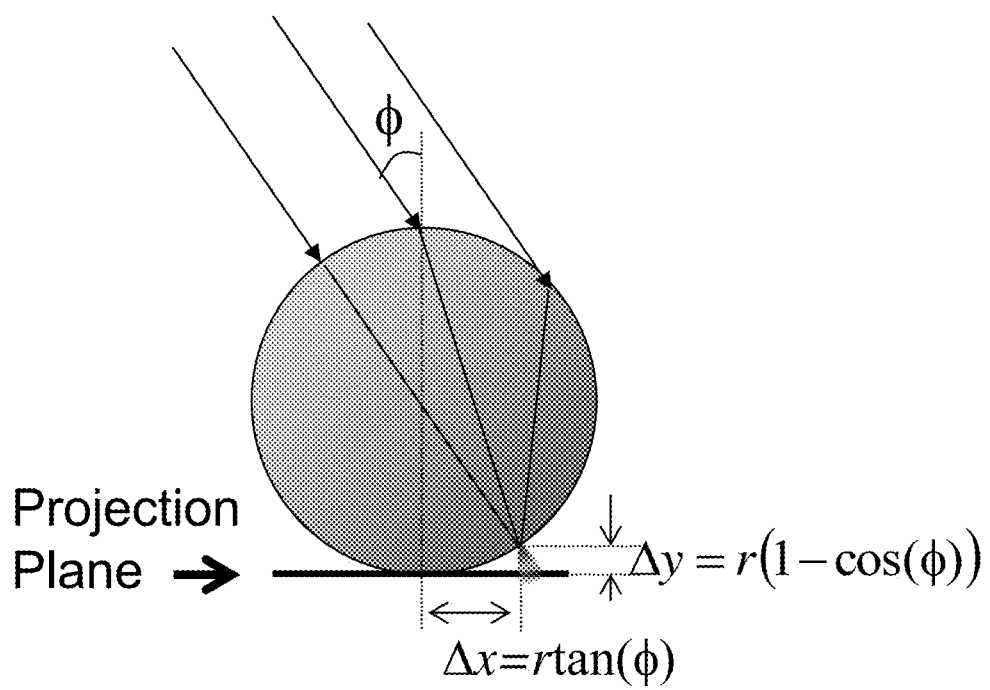
FIG. 1 is a side-view perspective that depicts a prior art photonic jet produced by a dielectric sphere.
Figure 2:
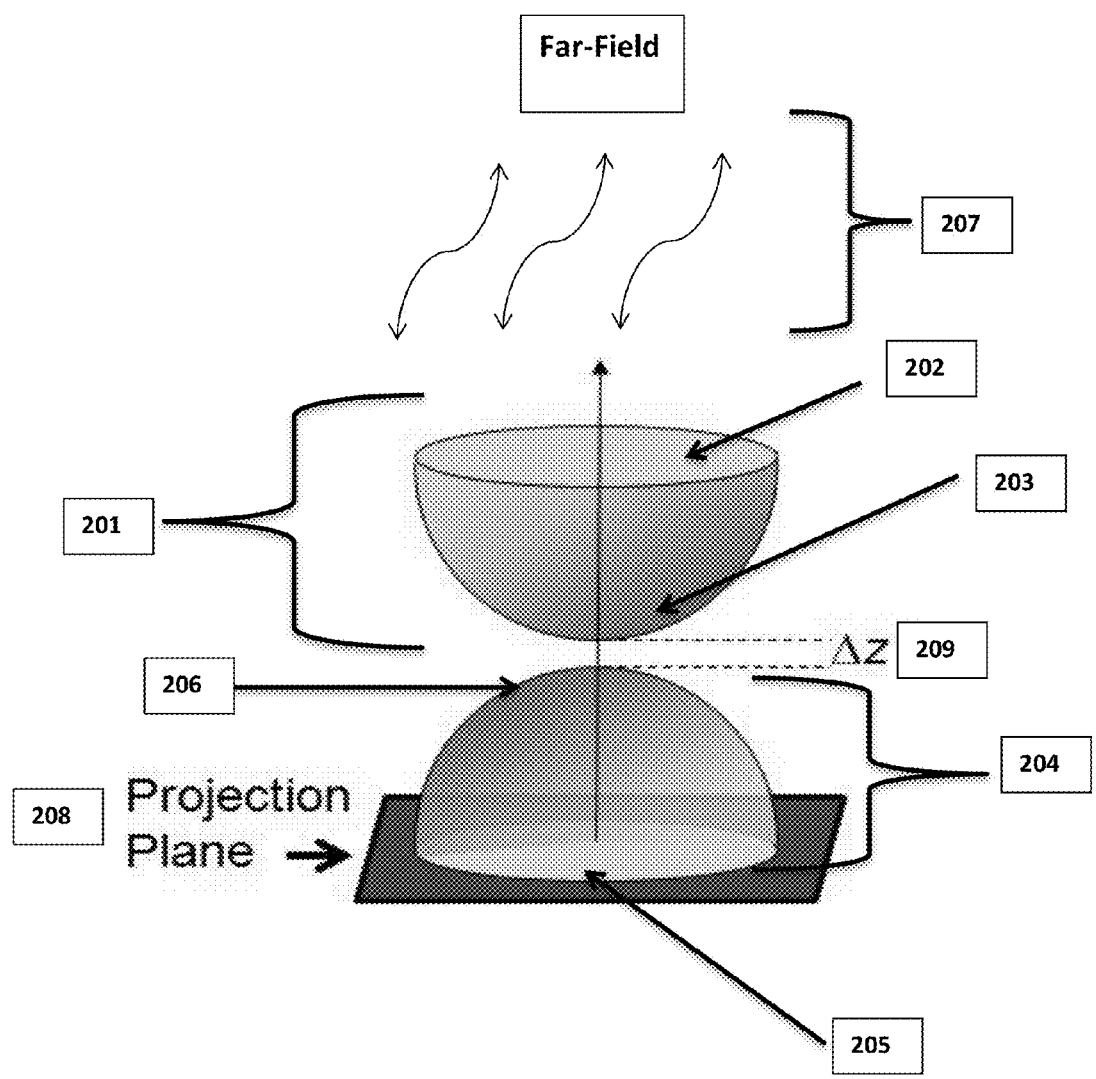
FIG. 2 is a side-view perspective that depicts a preferred embodiment of the apparatus for imaging a surface with small spot-size and large field of view.

The method disclosed herein is a novel means for imaging onto a flat surface with a resolution that is about less than or equal to one-half the wavelength of an incident electromagnetic wave. This robust method allows the imaging onto a flat surface without the limitations inherent in a method utilizing the dielectric sphere depicted in FIG. 1. Referring to FIG. 2, a preferred embodiment of this method comprises providing a first hemisphere 201.

The first hemisphere has a first planar side 202 and a first spherical side 203. The preferred embodiment of this method also includes providing a second hemisphere 204. The second hemisphere has a second planar side 205 and a second spherical side 206. The first hemisphere is placed subsequent to an incident planar electromagnetic wave 207, and is oriented so that the first planar side is nearer to the incident planar electromagnetic wave than the first spherical side.

In this embodiment of the method, a flat light sensitive surface provided and is placed subsequent the second hemisphere 204. In addition, the flat light sensitive surface is placed in contact with the second planar side 205 of the second hemisphere. Next, the first hemisphere 201 is exposed to the incident planar electromagnetic wave 207 and the Fourier transform ("the photonic nanojet") of the incident planar electromagnetic wave is produced on the flat light sensitive surface.

The first hemisphere and the second hemisphere project the Fourier transform of the incident planar wave to the projection plane 208.

In a more preferred embodiment of the method, the incident planar electromagnetic wave 207 has a wavelength greater than or equal to one nanometer. Moreover, in this more preferred embodiment the first planar side 202 has a diameter that is greater than or equal to one-half the wavelength of the incident planar electromagnetic wave 207. Moreover, in this more preferred embodiment, the second planar side 205 has a diameter that is greater than or equal to one-half the wavelength of the incident planar electromagnetic wave 207.

In this more preferred embodiment of the method the first hemisphere 201 is comprised of a dielectric material that is transparent to the wavelength of the incoming planar incident electromagnetic wave 207 and comprises an index that is between 0.4 and 0.7 greater than the surrounding medium. While not meant to be limiting, some dielectric materials from which the first hemisphere is comprised include glass, borosilicate glass, Poly(methyl methacrylate) ("PMMA"), Polyethylene Terephthalate ("PET"), Polyethylene ("PE"), High Density Polyethylene ("HDPE") Low Density Polyethylene ("LDPE") polypropylene ("PP"), High Density Polypropylene ("HDPP"), Low Density Polypropylene ("LDPP"), and Aluminum Oxide ("$Al_2O_3$").

In this more preferred embodiment, the second hemisphere 204 is comprised of a dielectric material that is transparent to the wavelength of the incoming planar incident electromagnetic wave 107 and comprises an index that is between 0.4 and 0.7 greater than the surrounding medium. While not meant to be limiting, some dielectric materials from which the second hemisphere is comprised include glass, borosilicate glass, Poly(methyl methacrylate) ("PMMA"), Polyethylene Terephthalate ("PET"), Polyethylene ("PE"), High Density Polyethylene ("HDPE") Low Density Polyethylene ("LDPE") polypropylene ("PP"), High Density Polypropylene ("HDPP"), Low Density Polypropylene ("LDPP"), and Aluminum Oxide ("$Al_2O_3$"). The first hemisphere and the second hemisphere can comprise the same dielectric material, or different dielectric material. The dielectric material comprising the first hemisphere and second hemisphere need not be the same. Moreover, the dielectric material of the first hemisphere and the second hemisphere need not be different.

In a still further preferred embodiment of the method, the distance ($\Delta Z$) 209 between the first spherical side and said second spherical side is less than or equal to the radius of the smaller of either the first hemisphere or second hemisphere.

Due to the reciprocity of the optics disclosed herein, the above two hemispheres can also produce the Fourier transform of an image placed in the projection plane at the far-field. Thus, a conventional flat imaging array, or display, can be hybridized with this type of apparatus to produce a three-dimensional image or display. In this particular instantiation the electromagnetic wave source would be placed at the projection plane, or the scatter from an object placed at the projection plane, would be produced by the optics in the far-field. Thus, the method to utilize such an apparatus would include the producing of the Fourier transform of the electromagnetic wave source, or scatter form object placed in the projection plane, at the far-field, rather than the near-field.

Figure 5A:
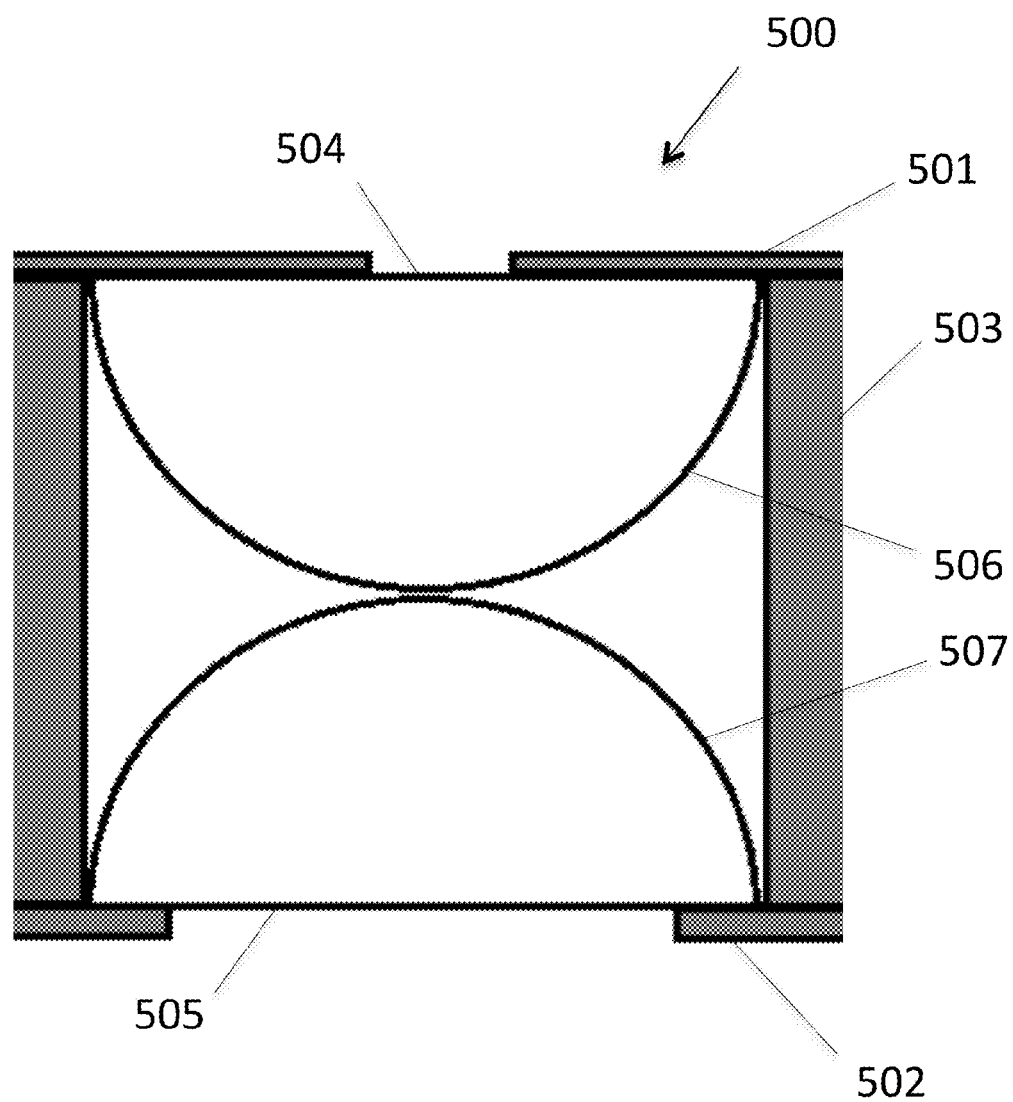
FIG. 5B illustrates one exemplary embodiment of a fabricated large-scale PPJL apparatus disclosed herein.
Figure 5B:
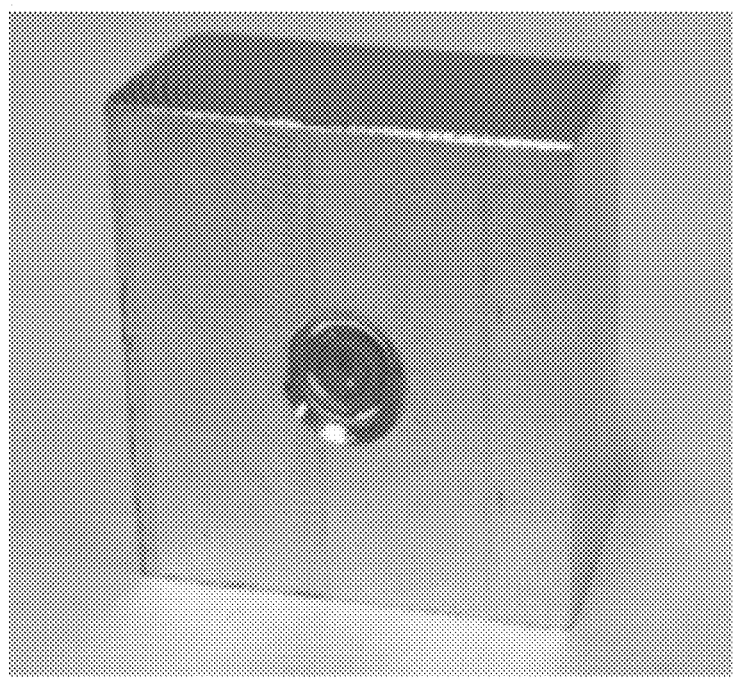
Figure 6A:
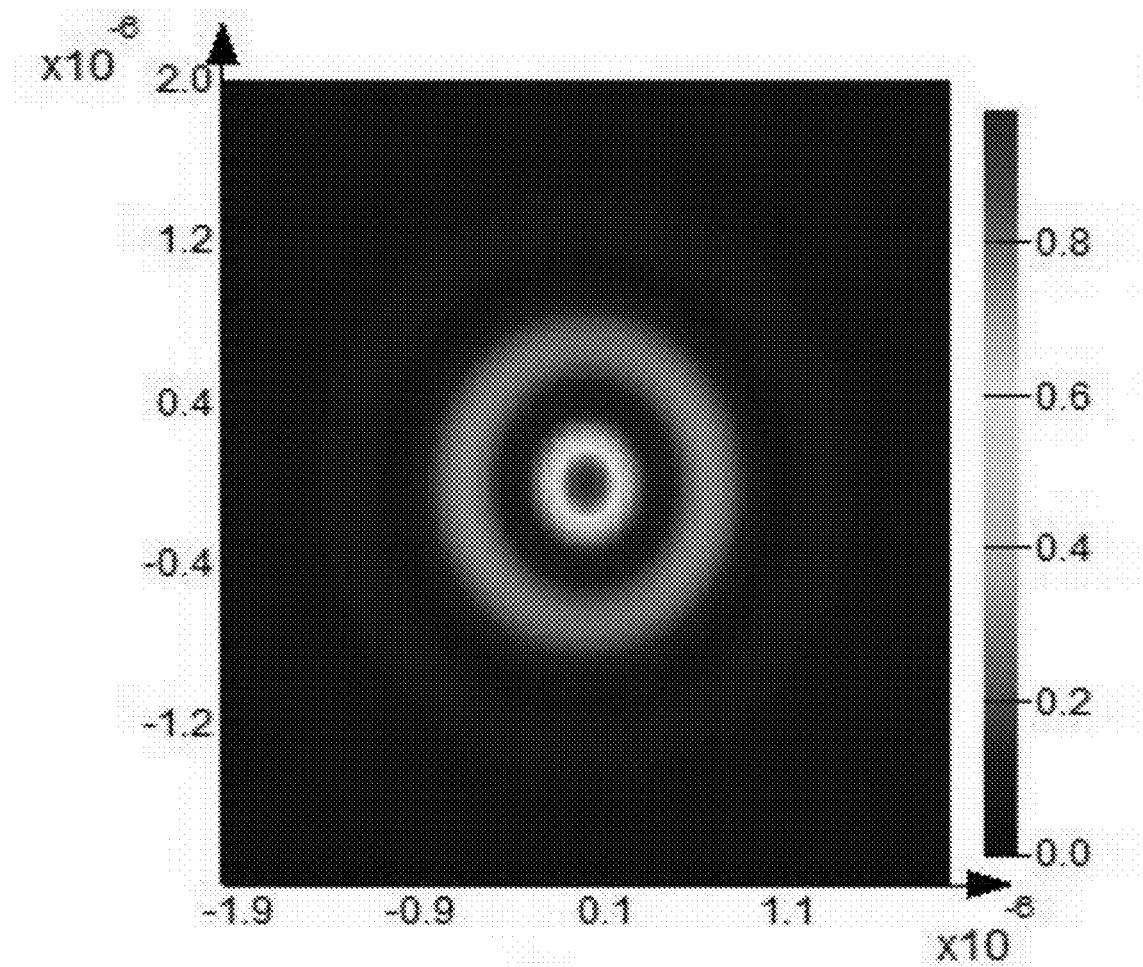
FIG. 6A depicts power flow in surfaces perpendicular to the axis on the flat surface of second hemisphere.
Figure 6B:
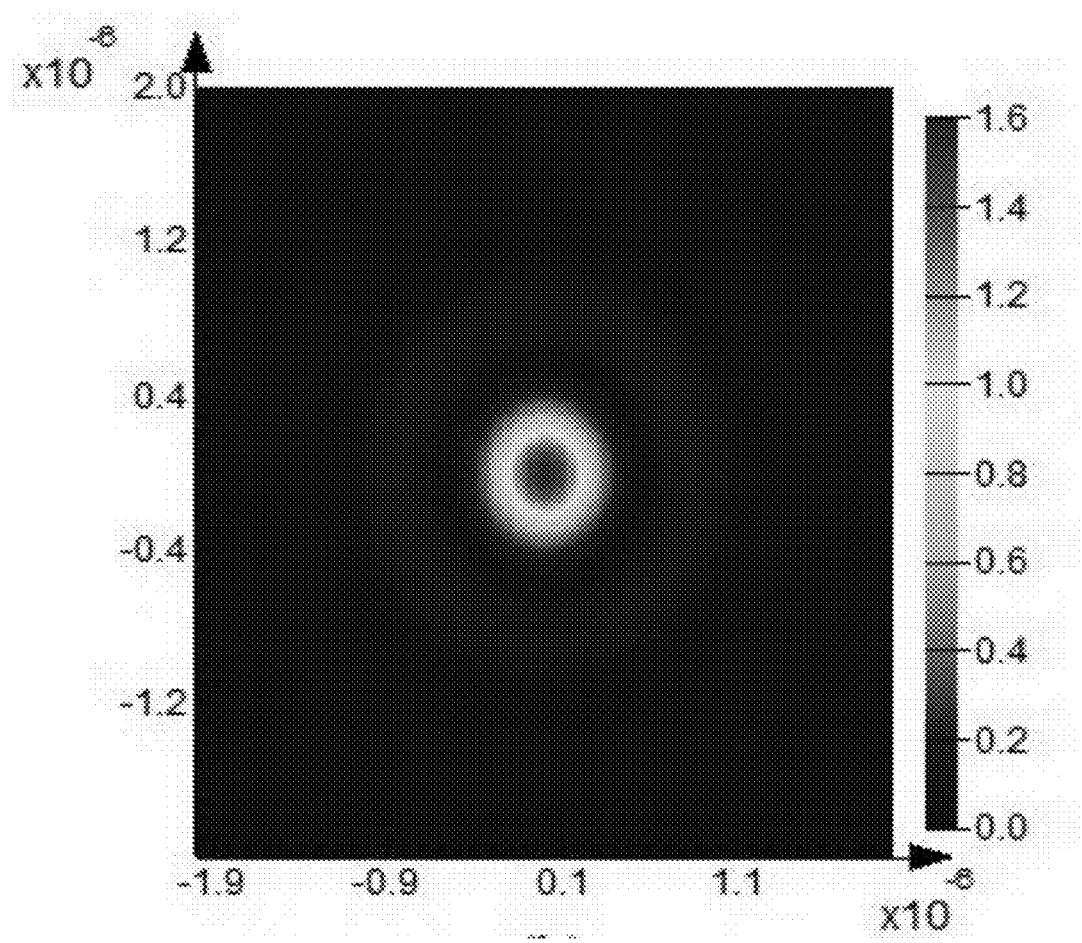
FIG. 6B depicts power flow in 1 micron away from the surfaces perpendicular to the axis on the flat surface of second hemisphere.

Large-Scale Fabrication of a Planar Photonic Jet (PPJL) and Comparison to a Prior Art Design Referring to FIG. 5A, a side view perspective of a holder 500 is presented for holding hemispheres 506 and 507 of planar photonic jet (PPJL) together. It consists of three elements: upper plate 501, lower plate 502 and housing 503. Upper plate 501 has the aperture 504 to limit incoming light distribution. Lower plate 502 has a hole 505 smaller than the greatest lateral dimension of hemisphere 507 to ensure that hemispheres 506 and 507 are held securely in holder 500. Holder 500 and its associated elements can be made of a variety of materials. Referring to FIG. 5B, an exemplary holder composed of aluminum is illustrated. Details of the performance of the planar photonic jet are presented in Example 2 and FIGS. 6 and 7.

The PPJL photonic jet apparatus disclosed herein is compared with a standard telecentric lens design. Referring to FIG. 8, telecentric lens structure 800 is made of four elements 801, 802, 803 and 804 with the aim of achieving wide field of view. For comparison, telecentric lens 800 is scaled to have same image height as the PPJL disclosed herein.

To compare their field of view for three different incident light angles, their respective modular transfer function (MTF) is extracted. Two lenses are scaled to have image size equal to 5 mm in incident light angle equal to 20 degree. Incoming light aperture radius is set to 0.7 mm. FIGS. 9 and 10 respectively show the MTF for proposed lens and telecentric lens in three different incident light angels equal to 0 degree, 26 degree and 35 degree. These results demonstrate that the maximum field of view for telocentric lens is 24 degree, whereas the maximum field of view of the lens disclosed herein is within the range of 35 degrees.

EXAMPLES

Example 1

Simulation of Apparatuses and Methods of Using the Apparatuses Disclosed Herein

Figure 3A:
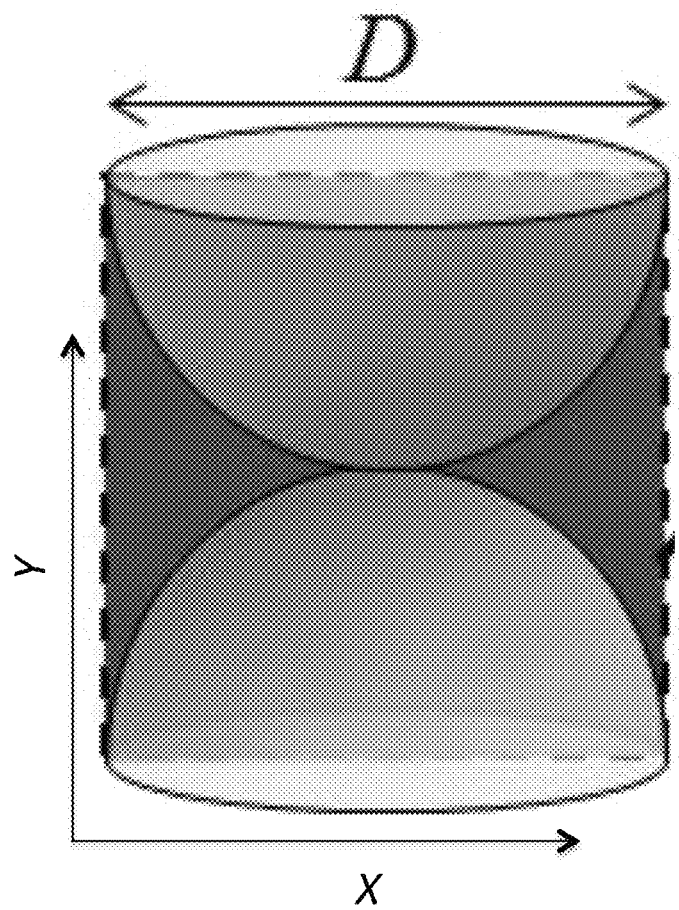
FIG. 3A is a side-view perspective that depicts an exemplary embodiment of the apparatus for imaging a surface with small spot-size and large field of view, wherein the X coordinate axis and Y coordinate axis are illustrated for reference to FIGS. 3B and 3C.

FIG. 3A illustrates the three-dimensional electromagnetic simulation of the apparatus and method disclosed herein based on the finite time-domain method that has been utilized to model the photonic nanojet. In this particular instance, the apparatus is comprised of two dielectric hemispheres with uniform index n=1.6 and with $\Delta Z=0$ (the distance between the first and second hemispheres).

Figure 3B:
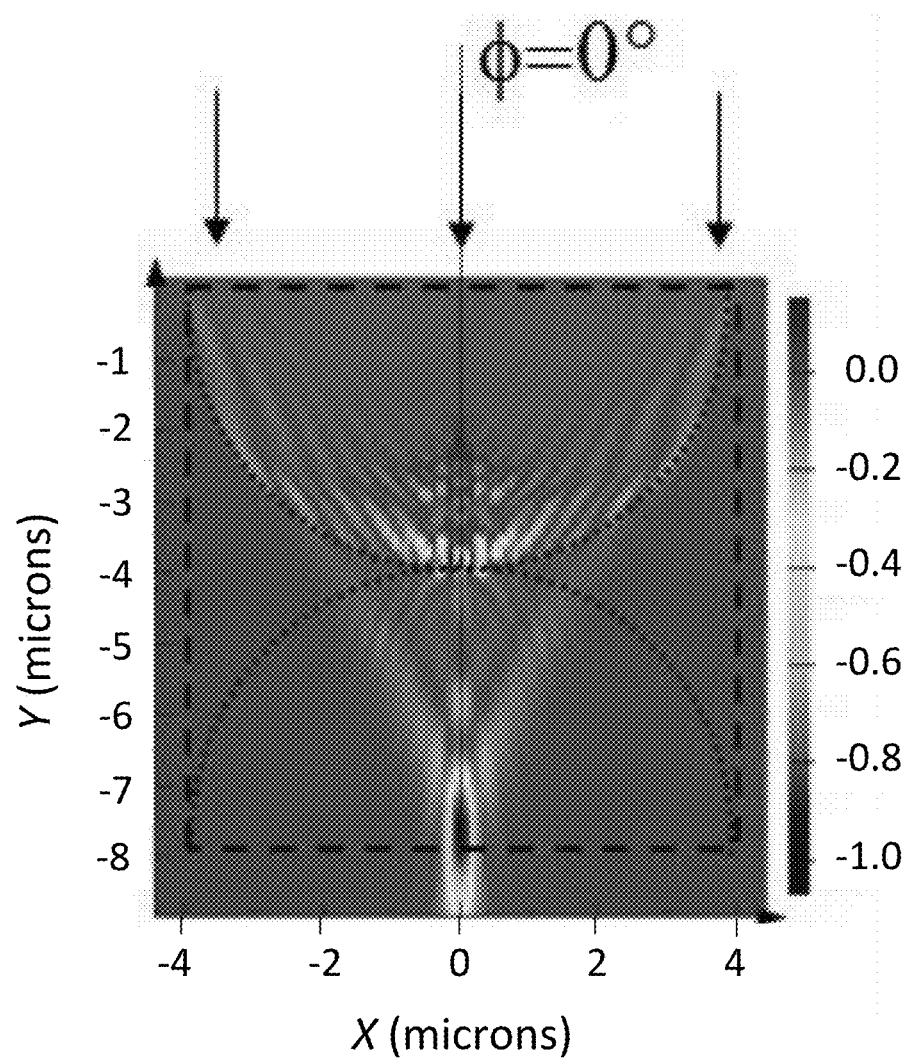
FIG. 3B illustrates the cross-sectional intensity profile of a electromagnetic wave while utilizing the exemplary apparatus for imaging a surface with small spot-size and large field of view, when the planar incident electromagnetic wave has an incidence angle $\phi=0$ degrees.
Figure 3C:
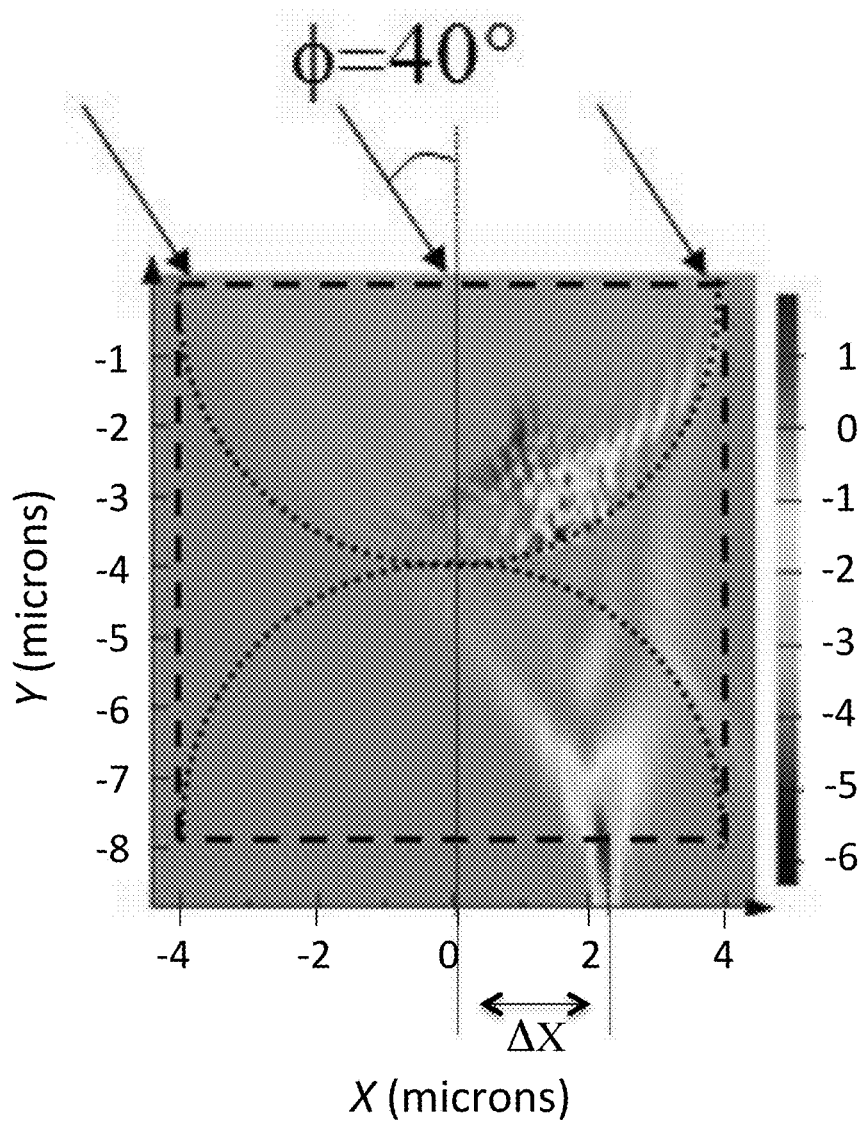
FIG. 3C illustrates the cross-sectional intensity profile of a electromagnetic wave while utilizing the exemplary apparatus for imaging a surface with small spot-size and large field of view, when the planar incident electromagnetic wave has an incidence angle $\phi=40$ degrees.
Figure 3D:
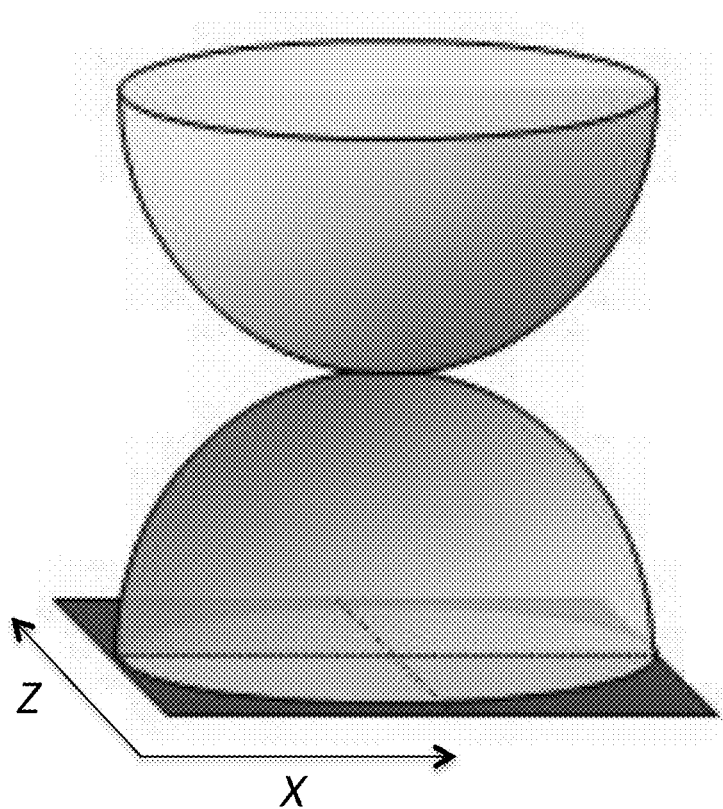
FIG. 3D is a side-view perspective that depicts an exemplary embodiment of the apparatus for imaging a surface with small spot-size and large field of view, wherein the X coordinate axis and Z coordinate axis are illustrated for reference to FIGS. 3E and 3F.

FIG. 3B illustrates that a planar electromagnetic wave with an incident angle $\phi=0$ (versus the projection plane normal vector) is focused into a single sub-wavelength spot at the center of the projection plane. FIG. 3C illustrates that when the incident angle is greater than or equal to $\phi=40$ that the spot is mapped to a different location on the projection plane while maintaining a sub-diffraction spot-size of approximately $\lambda/2$.

Figure 3E:
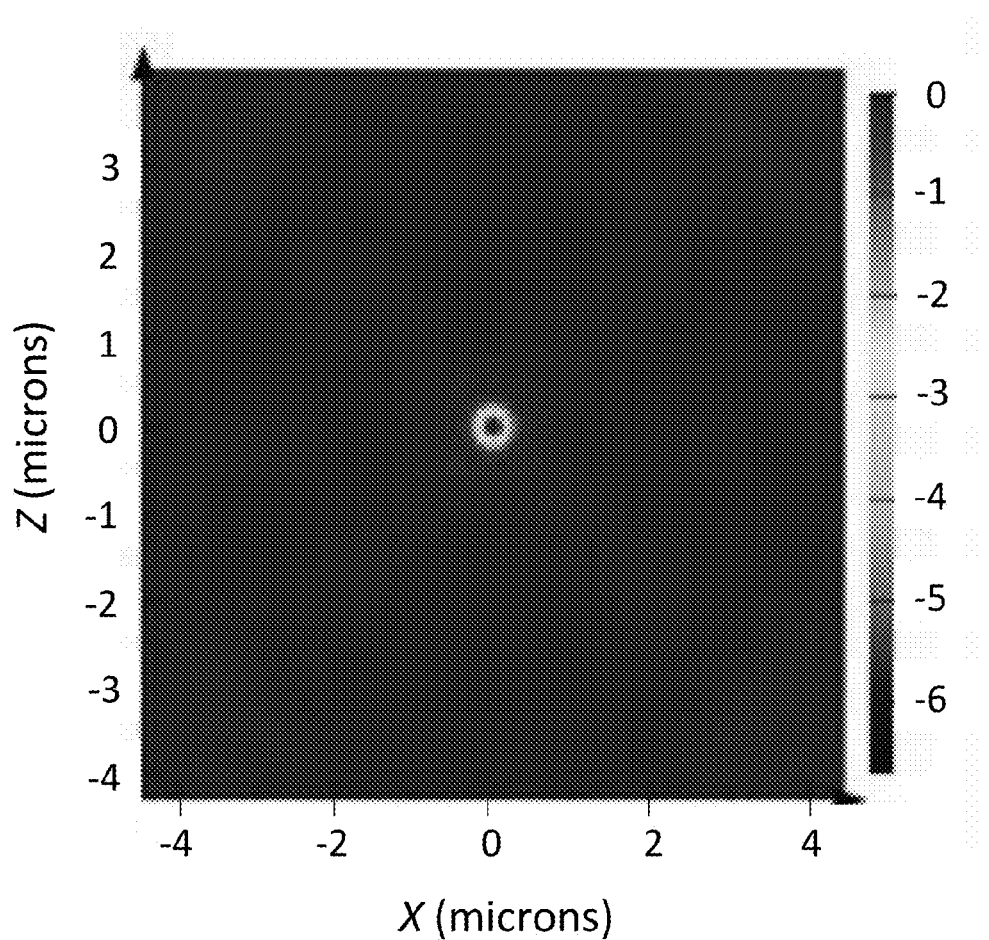
FIG. 3E illustrates the projection plane intensity profile of an electromagnetic while utilizing a disclosed herein, when the planar beam has an incidence angle $\phi=0$ degrees.
Figure 3F:
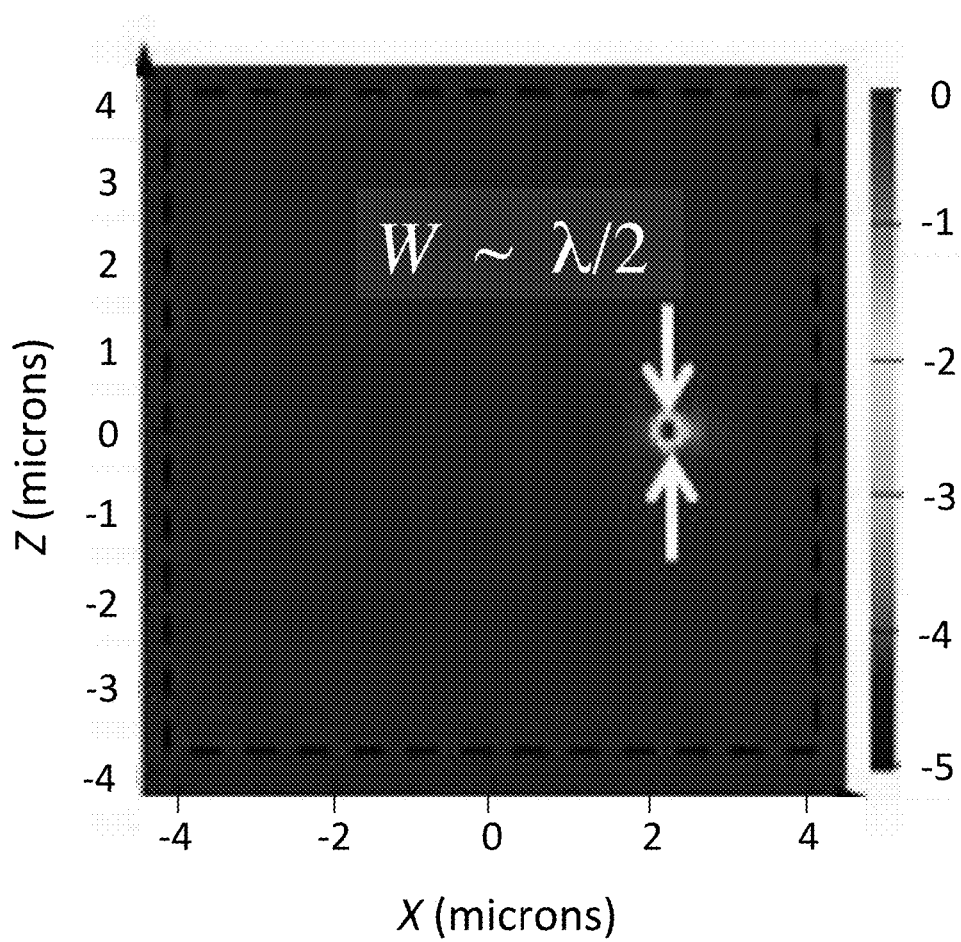
FIG. 3F illustrates the projection plane intensity profile of an electromagnetic wave while utilizing the apparatus for imaging a surface with small spot-size and large field of view that is disclosed herein, when the planar incident electromagnetic wave has an incidence angle $\phi=40$ degrees.

FIG. 3E illustrates that a planar electromagnetic wave with an incident angle $\phi=0$ (versus the projection plane normal vector) has a projection plane intensity profile focused into a single sub-wavelength spot at the center of the projection plane. FIG. 3F illustrates that when the incident angle is greater than or equal to $\phi=40$ that the projection plane image intensity profile t is mapped to a different location on the projection plane.

Figure 4:
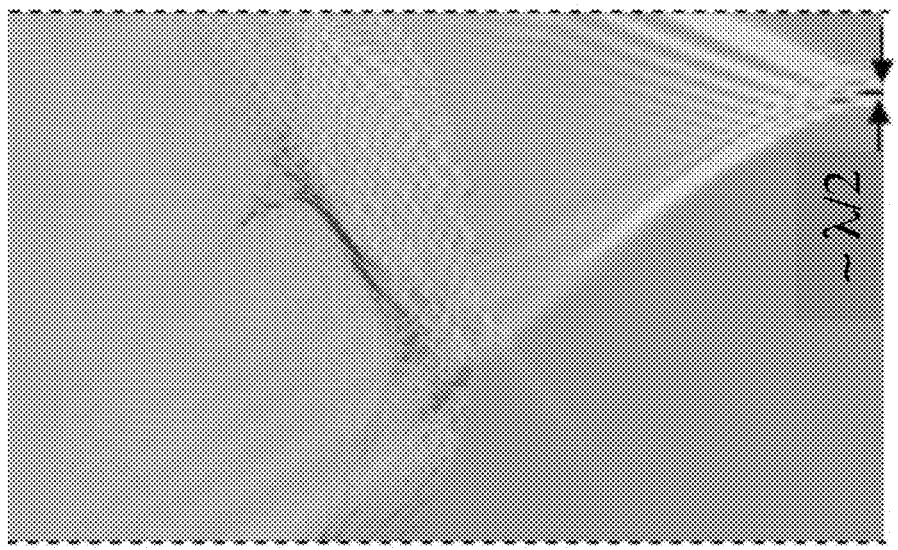
FIG. 4 illustrates that the apparatus disclosed herein is scalable at least by a factor of four without change in resolution FIG. 5A a schematic side perspective view of an exemplary lens holder for the photonic jet disclose herein.
Figure 4:
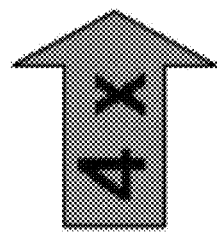
Figure 4:
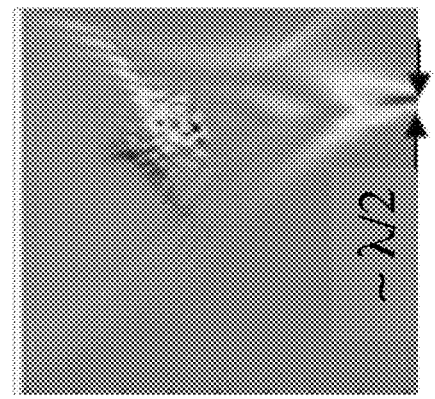

FIG. 4 illustrates that the dimensions of the Fourier transform produced by an apparatus disclosed herein can be scaled by a factor of four (4) without loss in resolution. The dimensions of the Fourier transform in FIG. 4 (image 2) are four-times larger than the Fourier transform in FIG. 4 (image 1), and the apparatus disclosed herein still produces the spot-size of about $\lambda/2$ (that is, the region delineated by the boundaries of the inverted double arrows (→←) for both images.

Example 2

Large Scale PPJL Fabrication and Comparison to Prior Art Designs

Figure 6C:
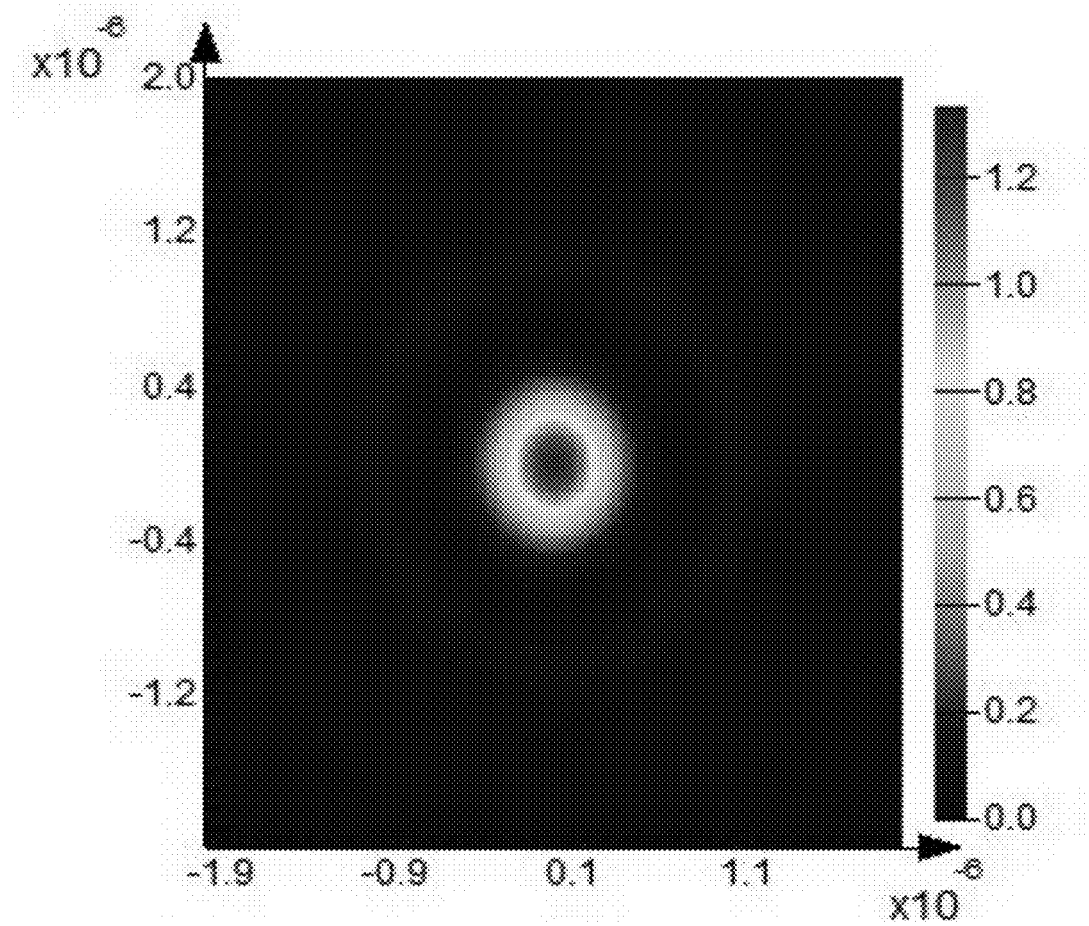
FIG. 6C depicts power flow in 2 microns away from the surfaces perpendicular to the axis on the flat surface of second hemisphere.

Full wave simulation using finite difference time domain method (FDTD) was employed to study characteristics of PPJL of small dimension. A forty-micron (40 μm) diameter lens was used and illuminated by plane wave. Power flow was captured in three planes, on the surface of hemisphere (FIG. 6A), 1 μm distance from surface of hemisphere (FIG. 6B) or 2 μm from surface of hemisphere (FIG. 6C). For having better understanding, normalized power flow is shown in FIG. 7 in the line y=0 and −2 μm<x<2 μm. Absolute values of Fourier transform per 1/mm are shown in FIG. 7.

FIG. 8A depicts a 2D view of ray trajectory for a prior art, four element telecentric lenses with incident light angels equal to 0 degree and 25 degree. FIG. 8B depicts a 2D view of ray trajectory for an exemplary embodiment of the photonic jet apparatus disclosed herein with incident light angels equal to 0 degree and 25 degree and 35 degree.

Results of using devices are presented in FIGS. 9A-F that depict power and MTF data for simulation for an embodiment of the photonic jet apparatus disclosed herein fitted with a lens of glass type E-PSK03 and image height of 5 mm at 35 degree field of view has a total length of 17.22 mm. By comparison, FIGS. 10A-F depict corresponding imaging experiments showing power and MTF data using an exemplary embodiment of a prior art telecentric lens with glass types BK7 (801), SF6 (802), SF6 (803) and BK6 (804) with and image size equal to 5 mm at maximum field of view has a total length of 27.6 mm.

It should be understood that the methods, procedures, operations, devices, and systems illustrated in the figures can be modified without departing from the spirit of the present disclosure. For example, these methods, procedures, operations, devices and systems can comprise more or fewer steps or components than appear herein, and these steps or components can be combined with one another, in part or in whole.

Furthermore, the present disclosure is not to be limited in terms of the particular embodiments described in this application, which are intended as illustrations of various embodiments. Many modifications and variations can be made without departing from its scope and spirit. Functionally equivalent methods and apparatuses within the scope of the disclosure, in addition to those enumerated herein, will be apparent to those skilled in the art from the foregoing descriptions.

In first aspect, an apparatus for producing the Fourier transform of an incident planar electromagnetic wave on a flat light sensitive surface placed in a projection plane, the Fourier transform having a spot-size less than or equal to one-half of the wavelength of said incident planar electromagnetic wave is disclosed. The apparatus includes the following components: a first hemisphere, said first hemisphere placed subsequent to said incident planar electromagnetic wave, said first hemisphere having a first planar side and a first spherical side, and said first hemisphere oriented so said first planar side is nearer to said incident planar electromagnetic wave than said first spherical side; and a second hemisphere, said second hemisphere placed subsequent to said first hemisphere, said second hemisphere having a second planar side and a second spherical side, said second hemisphere oriented to said second spherical side is nearer said first hemisphere than said second planar side. The first hemisphere and said second hemisphere project the Fourier transform of said incident planar electromagnetic wave to said projection plane.

In one aspect, the wavelength of said incident planar electromagnetic plane wave is greater than or equal to one nanometer. In another aspect, first planar side has a diameter greater than or equal to one-half of the wavelength of said incident planar electromagnetic wave.

In another aspect, the first hemisphere is comprised of a first dielectric material. In this respect, first dielectric material is transparent to the wavelength of the incident planar electromagnetic wave and further comprises an index that is between 0.4 and 0.7 greater than the surrounding medium. In some aspects, the first dielectric material is chosen from the group comprising glass, borosilicate glass, PMMA, PET, PE, HDPE, LDPE, PP, HDPP, LDPP, and $Al_2O_3$.

In another aspect, the second planar side has a diameter greater than or equal to one-half the wavelength of said incident planar electromagnetic wave. In this respect, the second hemisphere is comprised of a second dielectric material. In this respect, the second dielectric material is transparent to the wavelength of the incident planar electromagnetic wave and further comprises an index that is between 0.4 and 0.7 greater than the surrounding medium. In this respect, the second dielectric material is chosen from the group comprising glass, borosilicate glass, PMMA, PET, PE, HDPE, LDPE, PP, HDPP, LDPP, PE, HDPE, LDPE and $Al_2O_3$.

In some aspects, the flat light sensitive surface is a photosensitive film. In other aspects, the flat light sensitive surface is a detector array. In other aspects, the distance between said first spherical side and said second spherical side is less than or equal to the radius of the smaller of either said first hemisphere or said second hemisphere.

In a second aspect, a method for imaging onto a flat surface with a resolution that is about less than or equal to one-half of the wavelength of an incident planar electromagnetic wave is disclosed. The method includes several steps. The first step includes providing a first hemisphere, said first hemisphere placed subsequent to said incident electromagnetic wave, said first hemisphere having a first planar side and a first spherical side, and said first hemisphere oriented so said first planar side is nearer to said incident planar electromagnetic wave than said first spherical side. The second step includes providing a second hemisphere, said second hemisphere placed subsequent to said first hemisphere, said second hemisphere having a second planar side and a second spherical side, said second hemisphere oriented to said second spherical side is nearer said first hemisphere than said second planar side. The third step includes providing a flat light sensitive surface, said flat light sensitive surface placed subsequent to said second hemisphere and in contact with said second planar side of said second hemisphere. The fourth step includes exposing said first hemisphere to said incident electromagnetic wave. The fifth step includes producing the Fourier transform of said incident electromagnetic wave on said flat light sensitive surface.

In one aspect of the method, the wavelength of said incident electromagnetic planar wave is greater than or equal to one nanometer. In another aspect, the first planar side has a diameter greater than or equal to one-half of the wavelength of said incident electromagnetic wave. In another aspect, the first hemisphere is comprised of a first dielectric material.

In some aspects, the first dielectric material is transparent to the wavelength of the incident electromagnetic wave and further comprises an index that is between 0.4 and 0.7 greater than the surrounding medium. In this respect, the first dielectric material is chosen from the group comprising glass, borosilicate glass, PMMA, PET, PE, HDPE, LDPE, PP, HDPP, LDPP, PE, HDPE, LDPE and $Al_2O_3$. In some aspects, the second planar side has a diameter greater than or equal to one-half the wavelength of said incident electromagnetic wave.

In another aspect, the second hemisphere is comprised of a second dielectric material. In this respect, the said second dielectric material is transparent to the wavelength of the incident electromagnetic wave and further comprises an index that is between 0.4 and 0.7 greater than the surrounding medium. In this respect, the second dielectric material is chosen from the group comprising glass, borosilicate glass, PMMA, PET, PE, HDPE, LDPE, PP, HDPP, LDPP, and $Al2O_3$.

In some aspects, the flat light sensitive surface is a photosensitive film. In some aspects, the flat light sensitive surface is a detector array. In some aspects, the distance between said first spherical side and said second spherical side is less than or equal to the radius of the smaller of either said first hemisphere or said second hemisphere.

TERMINOLOGY AND DEFINITIONS

The terminology used herein is for the purpose of describing particular embodiments only, and is not intended to be limiting. With respect to the use of substantially, any plural and/or singular terms herein, those having skill in the art can translate from the plural as is appropriate to the context and/or application. The various singular/plural permutations can be expressly set forth herein for the sake of clarity.

Terms used herein are intended as "open" terms (e.g., the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B and C, etc." is used, in general such a construction is intended in the sense of one having ordinary skill in the art would understand the convention (e.g., "a system having at least one of A, B and C" would include but not be limited to systems that have A alone, B alone, C alone, A and B together, A and C together, B and C together, and/or A, B, and C together.). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or 'B or "A and B."

All language such as "up to," "at least," "greater than," "less than," and the like, include the number recited and refer to ranges which can subsequently be broken down into subranges as discussed above.

A range includes each individual member. Thus, for example, a group having 1-3 members refers to groups having 1, 2, or 3 members. Similarly, a group having 6 members refers to groups having 1, 2, 3, 4, 5 or 6 members, and so forth.

The modal verb "can" refers to the preferred use or selection of one or more options or choices among the several described embodiments or features contained within the same.

Where no options or choices are disclosed regarding a particular embodiment or feature contained in the same, the modal verb "can" refers to an affirmative act regarding how to make or use and aspect of a described embodiment or feature contained in the same, or a definitive decision to use a specific skill regarding a described embodiment or feature contained in the same. In this latter context, the modal verb "can" has the same meaning and connotation as the auxiliary verb "can."

What is claimed is:

1. An apparatus for producing a Fourier transform of an incident planar electromagnetic wave on a projection plane, the apparatus comprising:
    a first half of a first sphere, the first half comprised of a first dielectric material and defining a first planar surface and a first spherical surface, the first half oriented so as to receive the incident planar electromagnetic wave on the first planar surface and to direct the incident planar electromagnetic wave onto the first spherical surface; and
    a second half of a second sphere, the second half comprised of a second dielectric material and defining a second planar surface and a second spherical surface, the second half oriented oppositely to the first half so as to receive the incident planar electromagnetic wave transmitted from the first spherical surface on the second spherical surface and to direct the incident planar electromagnetic wave onto the second planar surface,
    wherein the first half and the second half are configured to project the Fourier transform of the incident planar electromagnetic wave onto the projection plane, the Fourier transform having a spot-size less than or equal to one-half of the wavelength of the incident planar electromagnetic wave.

2. The apparatus of claim 1, wherein the wavelength of the incident planar electromagnetic wave is greater than or equal to one nanometer.

3. The apparatus of claim 1, wherein the first planar surface, the second planar surface, or both, has a diameter greater than or equal to one-half of the wavelength of the incident planar electromagnetic wave.

4. The apparatus of claim 1, wherein the first dielectric material and the second dielectric material are each transparent to the wavelength of the incident planar electromagnetic wave and each are characterized by an index of refraction that is between 0.4 and 0.7 greater than the surrounding medium.

5. The apparatus of claim 4, wherein the first dielectric material and the second dielectric material are each independently chosen from the group consisting of glass, borosilicate glass, PMMA, PET, PE, HDPE, LDPE, PP, HDPP, LDPP, and $Al_2O_3$.

6. The apparatus of claim 1, further comprising a flat light sensitive surface positioned in the projection plane to receive the projected Fourier transform.

7. The apparatus of claim 6, wherein the flat light sensitive surface is a detector array or a photosensitive film.

8. The apparatus of claim 6, wherein the flat light sensitive surface is also positioned such that it is in contact with the second planar surface.

9. The apparatus of claim 1, wherein the distance between the first spherical surface and the second spherical surface is less than or equal to the radius of the smaller of either the first half or the second half.

10. The apparatus of claim 9, wherein the distance is zero such that the first spherical surface and the second spherical surface are in contact.

11. The apparatus of claim 1, wherein the first planar surface and the second planar surface each have a diameter which is one-half of the wavelength of the incident planar electromagnetic wave or greater, but no more than about 40 μm.

12. The apparatus of claim 1, wherein the first dielectric material and the second dielectric material are each transparent to the wavelength of the incident planar electromagnetic wave and each are characterized by an index of refraction that is between 0.4 and 0.7 greater than the surrounding medium,
    and further wherein, wherein the distance between the first spherical surface and the second spherical surface is zero such that the first spherical surface and the second spherical surface are in contact.

13. The apparatus of claim 12, wherein the first planar surface and the second planar surface each have a diameter which is one-half of the wavelength of the incident planar electromagnetic wave or greater, but no more than about 40 μm.

14. The apparatus of claim 12, further comprising a flat light sensitive surface positioned in the projection plane to receive the projected Fourier transform and also positioned such that it is in contact with the second planar surface.

15. A method for imaging
    the method comprising:
    illuminating a first planar surface of an apparatus with an incident planar electromagnetic wave, the apparatus comprising
    a first half of a first sphere, the first half comprised of a first dielectric material and defining the first planar surface and a first spherical surface, the first half oriented so as to receive the incident planar electromagnetic wave on the first planar surface and to direct the incident planar electromagnetic wave onto the first spherical surface; and a second half of a second sphere, the second half comprised of a second dielectric material and defining a second planar surface and a second spherical surface, the second half oriented oppositely to the first half so as to receive the incident planar electromagnetic wave transmitted from the first spherical surface on the second spherical surface and to direct the incident planar electromagnetic wave onto the second planar surface, wherein the first half and the second half are configured to project a Fourier transform of the incident planar electromagnetic wave onto a projection plane of the apparatus, the Fourier transform having a spot-size less than or equal to one-half of the wavelength of the incident planar electromagnetic wave; and producing the Fourier transform having the spot-size less than or equal to one-half of the wavelength of the incident planar electromagnetic wave on the projection plane.

16. The method of claim 15, wherein the Fourier transform is produced on a flat light sensitive film positioned in the projection plane.

\* \* \* \* \*

UNITED STATES PATENT AND TRADEMARK OFFICE
CERTIFICATE OF CORRECTION

| | | |
|---|---|---|
| PATENT NO. | : 9,488,810 B2 | Page 1 of 1 |
| APPLICATION NO. | : 14/213674 | |
| DATED | : November 8, 2016 | |
| INVENTOR(S) | : Coroneo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 106 days.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*